(12) United States Patent
Roberts et al.

(10) Patent No.: US 7,246,178 B2
(45) Date of Patent: *Jul. 17, 2007

(54) METHODS AND SYSTEMS FOR CHANGING A TOPOLOGY OF A NETWORK

(75) Inventors: David Gary Roberts, Fremont, CA (US); Jeffrey Stuart Hansell, Fremont, CA (US); Mahesh Kumar, Fremont, CA (US)

(73) Assignee: Nortel Networks Limited, St. Laurent (CA)

( * ) Notice: Subject to any disclaimer, the term of this patent is extended or adjusted under 35 U.S.C. 154(b) by 878 days.

This patent is subject to a terminal disclaimer.

(21) Appl. No.: 10/141,444

(22) Filed: May 7, 2002

(65) Prior Publication Data

US 2003/0212776 A1 Nov. 13, 2003

(51) Int. Cl.
*G06F 15/16* (2006.01)
(52) U.S. Cl. ...................... 709/249; 719/313
(58) Field of Classification Search ........ 709/220–225, 709/227, 230, 217, 238, 239, 203, 204, 215, 709/250; 370/225, 352; 717/158, 174; 719/314, 313; 710/8
See application file for complete search history.

(56) References Cited

U.S. PATENT DOCUMENTS

| 5,051,987 A | | 9/1991 | Conlon | |
|---|---|---|---|---|
| 5,060,150 A | * | 10/1991 | Simor | 719/313 |
| 5,109,483 A | * | 4/1992 | Baratz et al. | 709/227 |
| 5,218,680 A | * | 6/1993 | Farrell et al. | 709/215 |
| 5,408,465 A | * | 4/1995 | Gusella et al. | 370/231 |
| 5,434,972 A | * | 7/1995 | Hamlin | 709/238 |
| 5,481,735 A | | 1/1996 | Mortensen et al. | |
| 5,526,414 A | | 6/1996 | Bédard | |
| 5,550,816 A | | 8/1996 | Hardwick et al. | |
| 5,577,028 A | | 11/1996 | Chugo et al. | |
| 5,583,862 A | | 12/1996 | Callon | |
| 5,592,622 A | | 1/1997 | Isfeld et al. | |
| 5,596,723 A | * | 1/1997 | Romohr | 709/222 |
| 5,598,410 A | | 1/1997 | Stone | |
| 5,636,371 A | | 6/1997 | Yu | |
| 5,684,800 A | | 11/1997 | Dobbins et al. | |

(Continued)

FOREIGN PATENT DOCUMENTS

WO PCTUS03/11421 4/2003

OTHER PUBLICATIONS

Inkra Networks, "New Data Center Architecture from Inkra Networks Enables Dedicated Services with Shared Economics," Press Release, Feb. 19, 2002, pp. 1-4, http://www.inkra.com/news_events/press/pr2002-02-19C.html.

(Continued)

*Primary Examiner*—Thong Vu
(74) *Attorney, Agent, or Firm*—Guerin & Rodriguez, LLP

(57) ABSTRACT

Methods and systems for processing a request of changing a first node having a first service connecting with a second node in a network environment are described herein. In one aspect of the invention, an exemplary method includes dynamically launching a second service at the first node, connecting the second service with the second node, directing requests for service to the second service, and terminating the first service. Other methods and systems are also described.

39 Claims, 19 Drawing Sheets

U.S. PATENT DOCUMENTS

| | | | |
|---|---|---|---|
| 5,764,736 A | 6/1998 | Shachar et al. | |
| 5,781,624 A | 7/1998 | Mitra et al. | |
| 5,799,151 A * | 8/1998 | Hoffer | 709/204 |
| 5,805,587 A | 9/1998 | Norris et al. | |
| 5,809,025 A | 9/1998 | Timbs | |
| 5,845,081 A * | 12/1998 | Rangarajan et al. | 709/224 |
| 5,852,607 A | 12/1998 | Chin | |
| 5,917,899 A | 6/1999 | Moss et al. | |
| 5,918,074 A | 6/1999 | Wright et al. | |
| 5,956,489 A * | 9/1999 | San Andres et al. | 709/221 |
| 6,041,058 A | 3/2000 | Flanders et al. | |
| 6,046,979 A | 4/2000 | Bauman | |
| 6,047,320 A | 4/2000 | Tezuka et al. | |
| 6,047,330 A | 4/2000 | Stracke, Jr. | |
| 6,055,618 A | 4/2000 | Thorson | |
| 6,069,895 A | 5/2000 | Ayandeh | |
| 6,072,774 A * | 6/2000 | Natarajan et al. | 370/231 |
| 6,085,238 A | 7/2000 | Yuasa et al. | |
| 6,085,247 A * | 7/2000 | Parsons et al. | 709/227 |
| 6,101,181 A | 8/2000 | Passint et al. | |
| 6,104,699 A | 8/2000 | Holender et al. | |
| 6,104,962 A | 8/2000 | Sastry | |
| 6,108,689 A | 8/2000 | Fagen et al. | |
| 6,112,249 A * | 8/2000 | Bader et al. | 709/239 |
| 6,130,875 A * | 10/2000 | Doshi et al. | 370/225 |
| 6,172,990 B1 | 1/2001 | Deb et al. | |
| 6,178,183 B1 | 1/2001 | Buskirk, Jr. | |
| 6,178,453 B1 | 1/2001 | Mattaway et al. | |
| 6,185,213 B1 | 2/2001 | Katsube et al. | |
| 6,208,623 B1 * | 3/2001 | Rochberger et al. | 370/254 |
| 6,212,560 B1 | 4/2001 | Fairchild | |
| 6,324,547 B1 * | 11/2001 | Lennert et al. | 707/204 |
| 6,366,947 B1 * | 4/2002 | Kavner | 709/203 |
| 6,370,381 B1 * | 4/2002 | Minnick et al. | 455/445 |
| 6,377,571 B1 | 4/2002 | Tai | |
| 6,381,735 B1 * | 4/2002 | Hunt | 717/158 |
| 6,549,516 B1 * | 4/2003 | Albert et al. | 370/236 |
| 6,606,744 B1 * | 8/2003 | Mikurak | 717/174 |
| 6,647,111 B1 * | 11/2003 | Bjornberg et al. | 379/220.01 |
| 6,678,264 B1 * | 1/2004 | Gibson | 370/352 |
| 6,760,324 B1 * | 7/2004 | Scott et al. | 370/352 |
| 6,802,068 B1 * | 10/2004 | Guruprasad | 719/319 |
| 6,816,500 B1 * | 11/2004 | Mannette et al. | 370/431 |
| 6,898,791 B1 * | 5/2005 | Chandy et al. | 719/314 |
| 2001/0034771 A1 * | 10/2001 | Hutsch et al. | 709/217 |
| 2001/0034791 A1 * | 10/2001 | Clubb et al. | 709/238 |
| 2001/0037397 A1 | 11/2001 | Boucher et al. | |
| 2001/0037407 A1 * | 11/2001 | Dragulev et al. | 709/250 |
| 2002/0032787 A1 * | 3/2002 | Overton et al. | 709/230 |
| 2002/0069369 A1 | 6/2002 | Tremain | |
| 2002/0095493 A1 * | 7/2002 | Byrnes | 709/224 |
| 2002/0128925 A1 * | 9/2002 | Angeles | 705/26 |
| 2002/0143965 A1 * | 10/2002 | Aiken | 709/229 |
| 2003/0126234 A1 * | 7/2003 | Shachar et al. | 709/220 |
| 2003/0174697 A1 * | 9/2003 | Beshai | 370/370 |
| 2003/0191679 A1 * | 10/2003 | Casati et al. | 705/8 |
| 2003/0200295 A1 * | 10/2003 | Roberts et al. | 709/223 |
| 2004/0236874 A1 * | 11/2004 | Largman et al. | 710/8 |
| 2005/0198379 A1 * | 9/2005 | Panasyuk et al. | 709/239 |

OTHER PUBLICATIONS

Inkra Networks, "Inkra Hardwall: A Technology Overview," Feb. 2002, pp. 1-7, Fremont, CA, USA.

Inkra Networks, "Inkra 4000 Virtual Service Switch Architecture," Jul. 18, 2002, pp. 3-12, Inkra Networks Corp., Fremont, CA, USA.

Inkra Networks, "Service Providers Bullish on Inkra Networks' New Data Center Architecture," Press Release, Feb. 19, 2002, pp. 1-2, http://www.inkra.com/news_events, Inkra Networks Corp., Fremont, CA, USA.

Inkra Networks, "New Data Center Architecture Scales Multi-Tier Enterprise Applications While Slashing Data Center Cost and Complexity" Press Release, Feb. 19, 2002, pp. 1-2, http.//www.inkra.com/news_events.

* cited by examiner

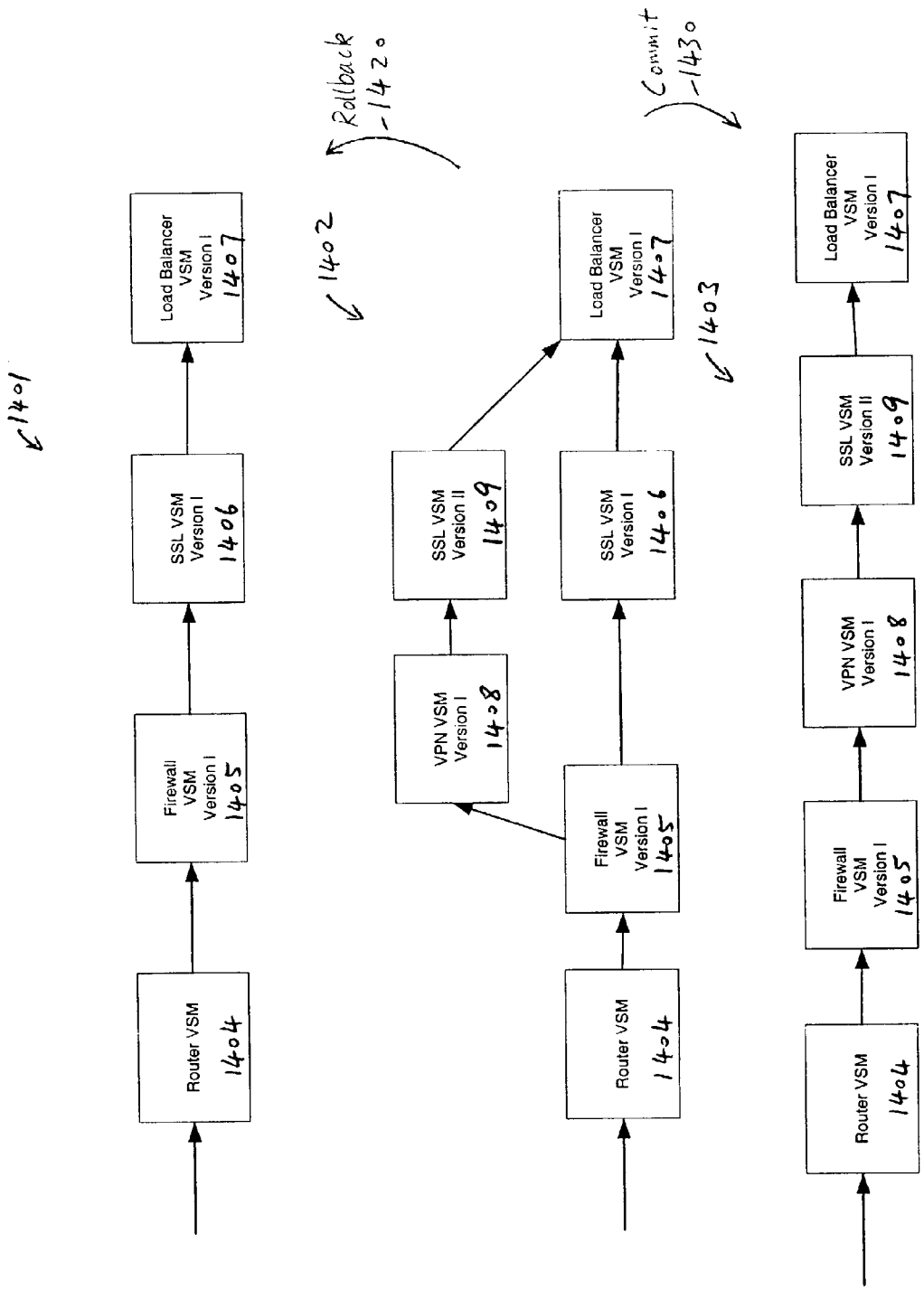

METHODS AND SYSTEMS FOR CHANGING A TOPOLOGY OF A NETWORK

NOTICE OF COPYRIGHT

A portion of the disclosure of this patent document contains material that is subject to copyright protection. The copyright owner has no objection to the facsimile reproduction by anyone of the software engines and modules, as they appears in the Patent and Trademark Office Patent file or records, but otherwise reserves all copyright rights whatsoever.

FIELD OF THE INVENTION

The present invention relates generally to network systems, and more specifically to a method of dynamically changing a topology of a network system without disrupting services being processed.

BACKGROUND OF THE INVENTION

A typical standard networking system implemented single-function, fixed functionality. The first generation of virtualized systems offers per-customer functionality, but the functionality is still fixed. These limitations lead to several drawbacks. Customers may judge service providers based on service availability. Customers may perceive any downtime as a problem with the service provider and may consider switching providers. Service providers want to add service products to their offerings to generate more revenue and increase margins with higher-value offerings. Some of today's systems require downtime associated with upgrades. This is the case because their systems package all functionality into a single runtime image. It is simpler to design and test a system when all functionality is packaged and released in a single unit. In some cases, the service provider has to minimize downtime by building a redundant topology and taking down one system while the backup system handles service. This is non-optimal because it forces the service provider to purchase redundant hardware and design complex configurations. To achieve economies of scale and lower capital expenditures, service providers are installing systems that service multiple customers on a single system. Rather than dedicating hardware to each individual customer, the service provider amortizes that capital expense across many customers, lowering the average cost. These service providers typically schedule downtime with their customers for routine maintenance. This scheduling is more difficult when multiple customers are configured to utilize the same system.

In addition, typical networking systems may offer fixed functionality that is composed in a fixed manner. For instance, the processing is usually layer 2 followed by layer 3, or secure socket layer (SSL) aceleration followed by load balancing. Typically, networking systems implement fixed functionality with a monolithic version of software. Those systems that offer Virtual loading typically use a simple link-time configuration strategy or simple Virtual loading at start time, but not thereafter. Thus, you may get to choose what functionality you want to run at startup time, but you cannot change it thereafter. Typically, prior systems have had disadvantages such as they require a reboot when they are upgraded. This causes downtime. As a result, some conventional systems lack the ability to configure functionality in an arbitrary manner using an arbitrary topology, to add new functionality to a running system without causing downtime, or to upgrade a portion of functionality to a new revision.

Furthermore, in data enters, from time to time they have to upgrade the software running on a packet processing system or change the network topology or upgrade the hardware. Any upgrade of software or hardware disrupts the service availability. Such upgrades are normally done during the maintenance hours in which the service is not available to the customers. Alternatively, the service network is duplicated so that the service is available on one of networks always. In the first approach, service is disrupted. In the second approach, redundant network must be setup and maintained carefully.

Therefore, a better solution is highly desirable to be able to compose, manage, change, or upgrade a topology of a network system.

SUMMARY OF THE INVENTION

Methods and systems for changing a first node having a first service connecting with a second node in a network environment are described herein. In one aspect of the invention, an exemplary method includes dynamically launching a second service at the first node, connecting the second service with the second node, directing requests for service to the second service, and terminating the first service.

In one particular exemplary embodiment, the method includes determining whether the requests for service come from a new session of data, transmitting the requests for service to the second service if the requests for service come from a new session of data, and transmitting the requests for service to the first service if the requests for service come from an existing session of data. Further, the first service is terminated when a pre-specified condition is satisfied. In one embodiment, the pre-specified condition may include an amount of data that needs to be processed. Alternatively, the pre-specified condition may include a period of time. In one embodiment, anytime before the pre-specified condition is satisfied, the second service may be terminated and rolled back to the first service.

The present invention includes systems which perform these methods and machine-readable media which, when executed on a data processing system, cause the system to perform these methods. Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

FIG. 14 shows a block diagram of dynamic change/upgrade of a topology in a virtual network system according to yet another alternative embodiment of the invention.

DETAILED DESCRIPTION

The following description and drawings are illustrative of the invention and are not to be construed as limiting the invention. Numerous specific details are described to provide a thorough understanding of the present invention. However, in certain instances, well-known or conventional details are not described in order to not unnecessarily obscure the present invention in detail.

Figure 1:
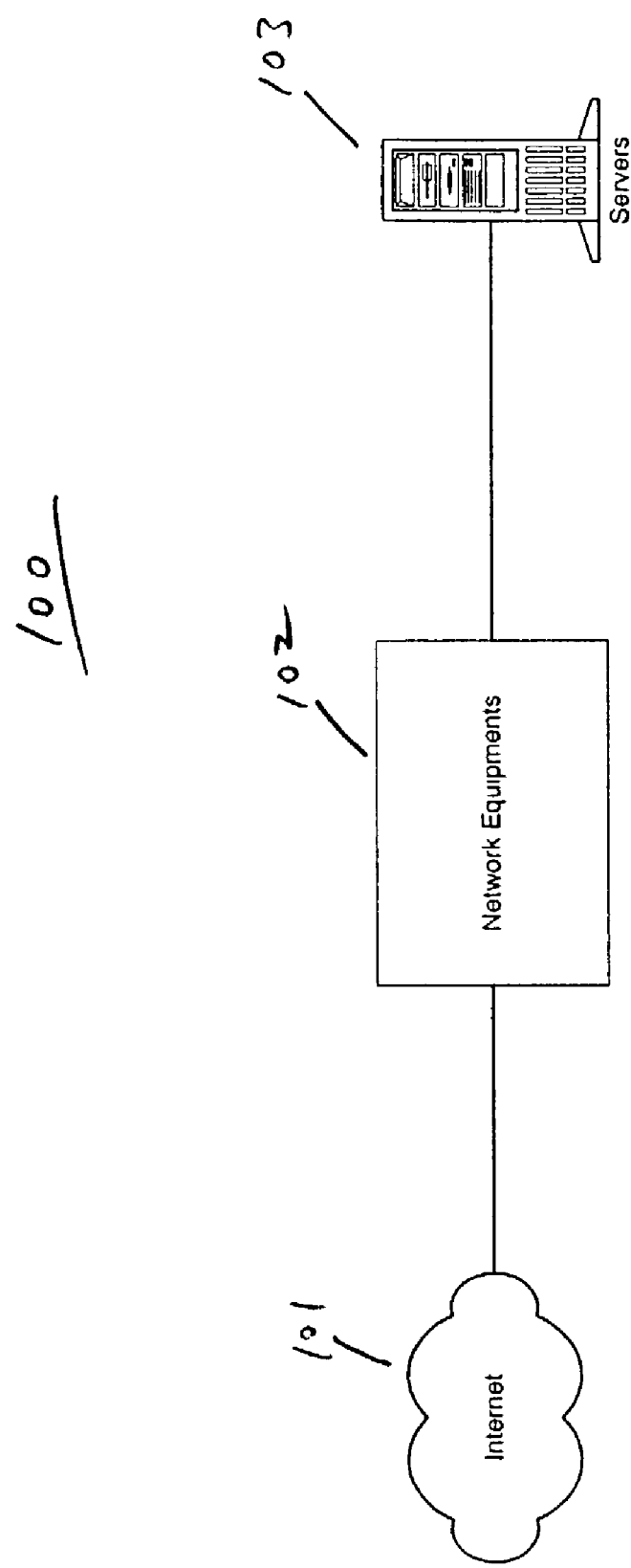
FIG. 1 shows an exemplary block diagram of a network system which may be used with the present invention.

FIG. 1 illustrates a network system which may be used with the present invention. The network system 100 includes an outside network such as Internet 101, network equipments 102, and a plurality of network servers 103. The network equipments 102 receive data packets from another network system over the Internet 101. The data may be received from a client such as a personal computer. Alternatively, the data may be received from another network environment, such as corporate intranet. The data may be packaged in TCP/IP protocol. The network equipments 102 receive the data; the network equipments 102 identify the source and the destination of the servers being targeted. The network equipments 102 process the data and distribute the data flow to an appropriate server within the servers 103. In return, one or more servers within the servers 103 process the data packets and respond accordingly. The responses are transmitted from the corresponding servers to the network equipments 102 which will resolve the destination of the client and transmit the data back to the appropriate client over the Internet 101. Multiple servers 103 may share a physical port or IP address; however, each server of the servers 103 may be identified by a corresponding logical ID identified by the network equipment 102. It is the network equipments 102 responsibility to resolve these resources which will be described in further details below.

Figure 2:
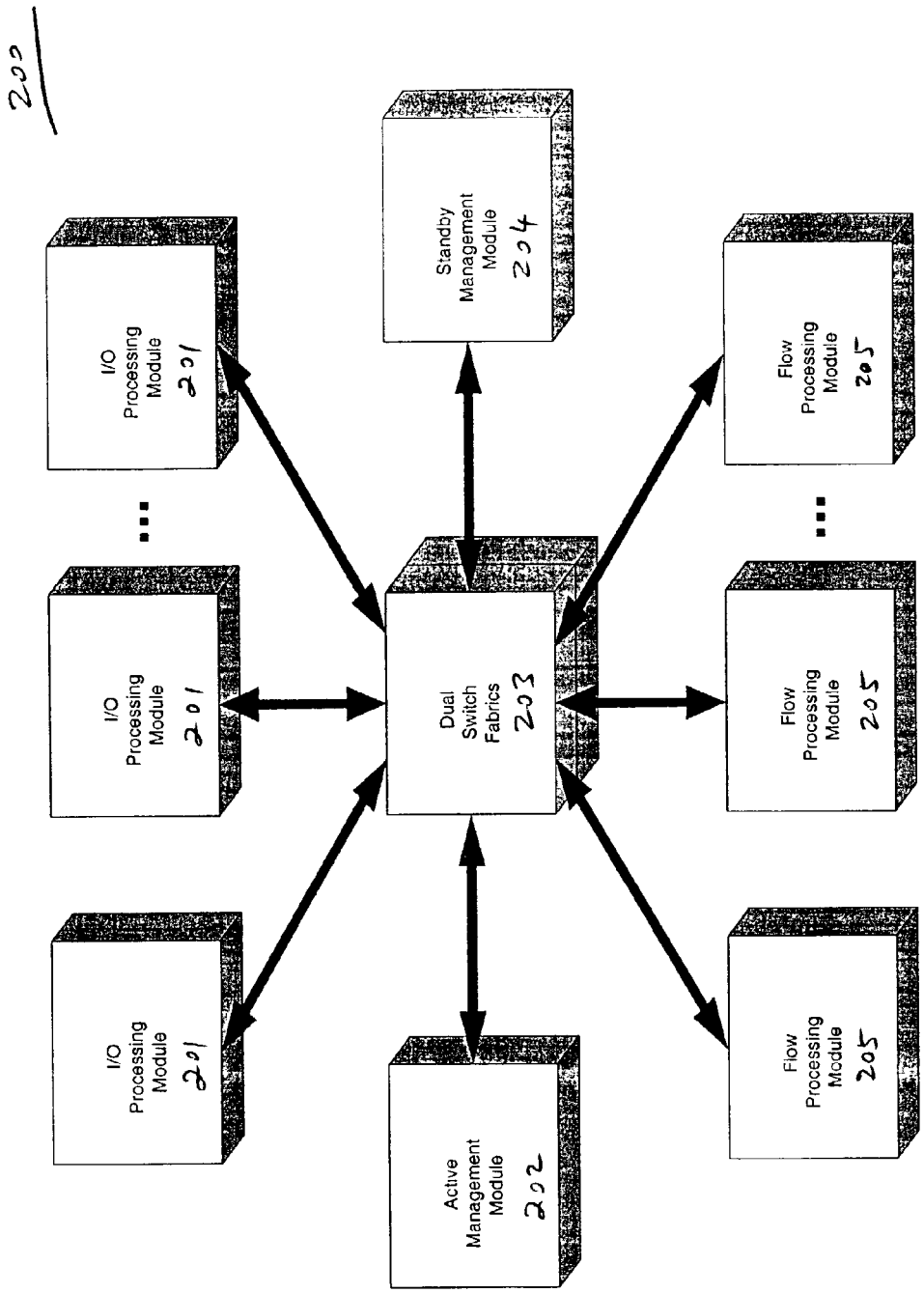
FIG. 2 shows a block diagram of an exemplary architecture of an embodiment of the present invention.

FIG. 2 illustrates an exemplary architecture of one embodiment of the present invention. The system 200 includes input/output (I/O) modules 201, management modules 202 and 204, switch fabric module 203, and service processing modules 205. Service processing module (SPM) is also called flow processing module (FPM). When a data flow comes in from an outside network such as Internet 101 of FIG. 1, the I/O module 201 receives the data and classifies all incoming packets for membership in an existing flow. The management processing module 202 controls all management processing. The management processing module 202 initializes the system, implements the various management interfaces including command line interface (CLI), simple network management protocol (SNMP), Web management, and to responds to configuration and reconfiguration requests. The service process module 205 processes all incoming data and distributes the data to an appropriate server within the servers 103 of FIG. 1. The standby management module 204 is supplemental to the main management module 202. In the cases that the main management module 202 fails, the standby management module 204 will actively resume all duties of the management functionality. All of the modules are coupled to the switch fabrics 203 which coordinate all of the traffic flows between the modules.

Figure 3:
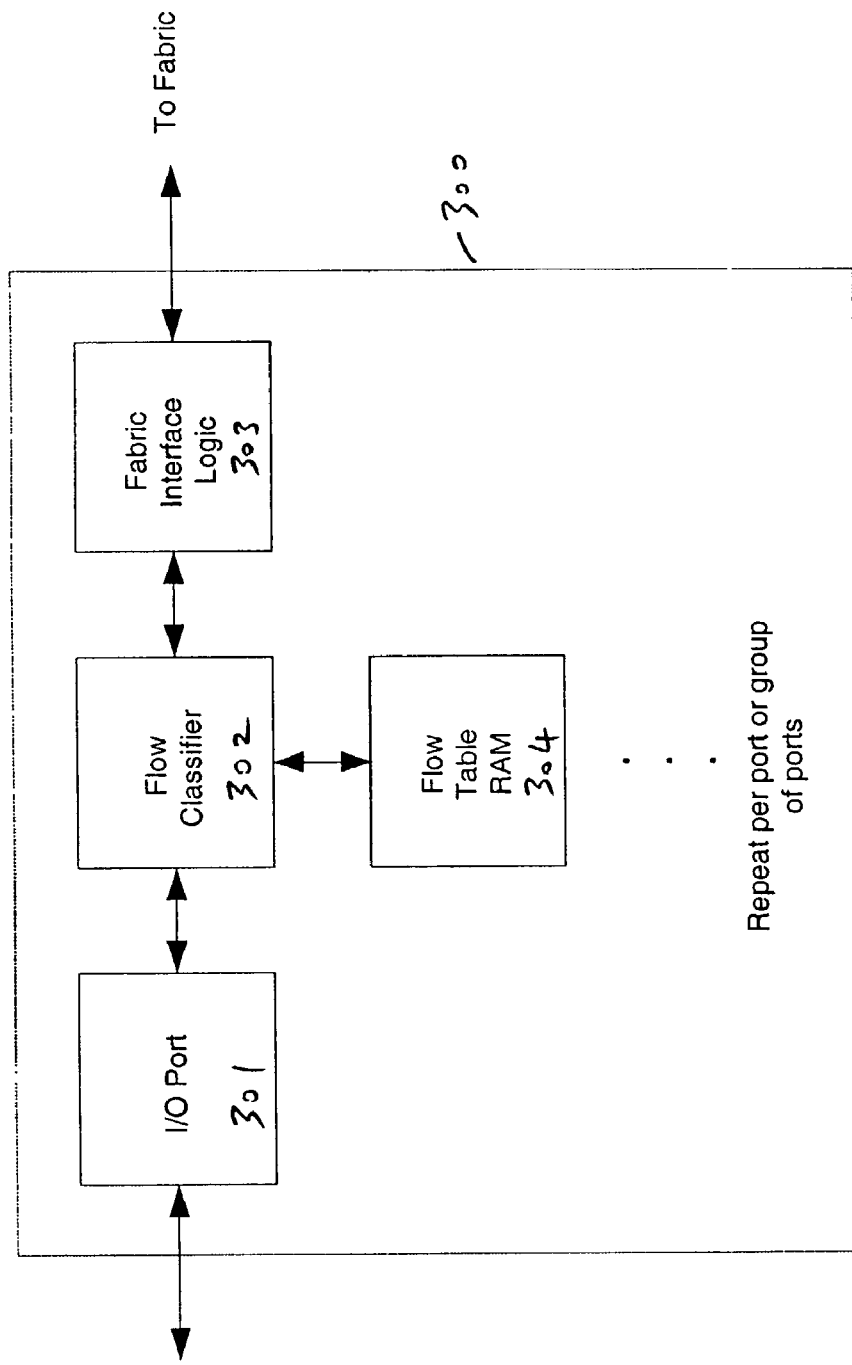
FIG. 3 shows a simplified block diagram of an input/output (I/O) module according to one embodiment of the invention.

FIG. 3A shows an exemplary block diagram of an I/O module according to one embodiment of the invention. The I/O module 300 includes an I/O port 301, a flow classifier 302, a fabric interface logic 303, and a flow table random access memory (RAM) 304. There are several types of I/O modules, each having different port counts, port speeds, and media types. In one embodiment, the I/O modules may be Ethernet variants (e.g., 10/100, gigabit, 10 gigabit, fiber, copper, etc.). The I/O modules may share a basic abstract architecture.

The I/O port 301 represents both the media access control (MAC) and physical (PHY) layers. Typically, this will be a 100 Mbps, 1 Gbps, or 10 Gbps Ethernet MAC/PHY. In the case of 100 Mbps Ethernet ports, there may be a high level of integration of this block, having one chip integrating multiple physical ports. The flow classifier 302 is responsible for mapping incoming packets to the appropriate flow. Depending on the available bandwidth, the flow classifier 302 may serve more than one physical port. The flow classifier 302 may be implemented either by a standard network processor implementing the flow classification algorithm or as an application specific integrated circuit (ASIC).

The I/O module 300 is also responsible parsing the incoming packet in order to determine which SPE should handle the packet. Rather than duplicate this parsing at each SPE, according to one embodiment of the invention, the I/O module 300 creates length fields and a format field that will be sent along with the packet to the SPE. These fields will enable the fast-path, which will be described in further details below, to setup internal buffers with pre-parsed packets without having to replicate all of the I/O module's work. The fabric messages section has tables that show the message header that will be sent between the I/O modules and the service processing modules. In one embodiment, packets that span more than one fabric cell may be required to have a packet trailer.

Figure 4A:
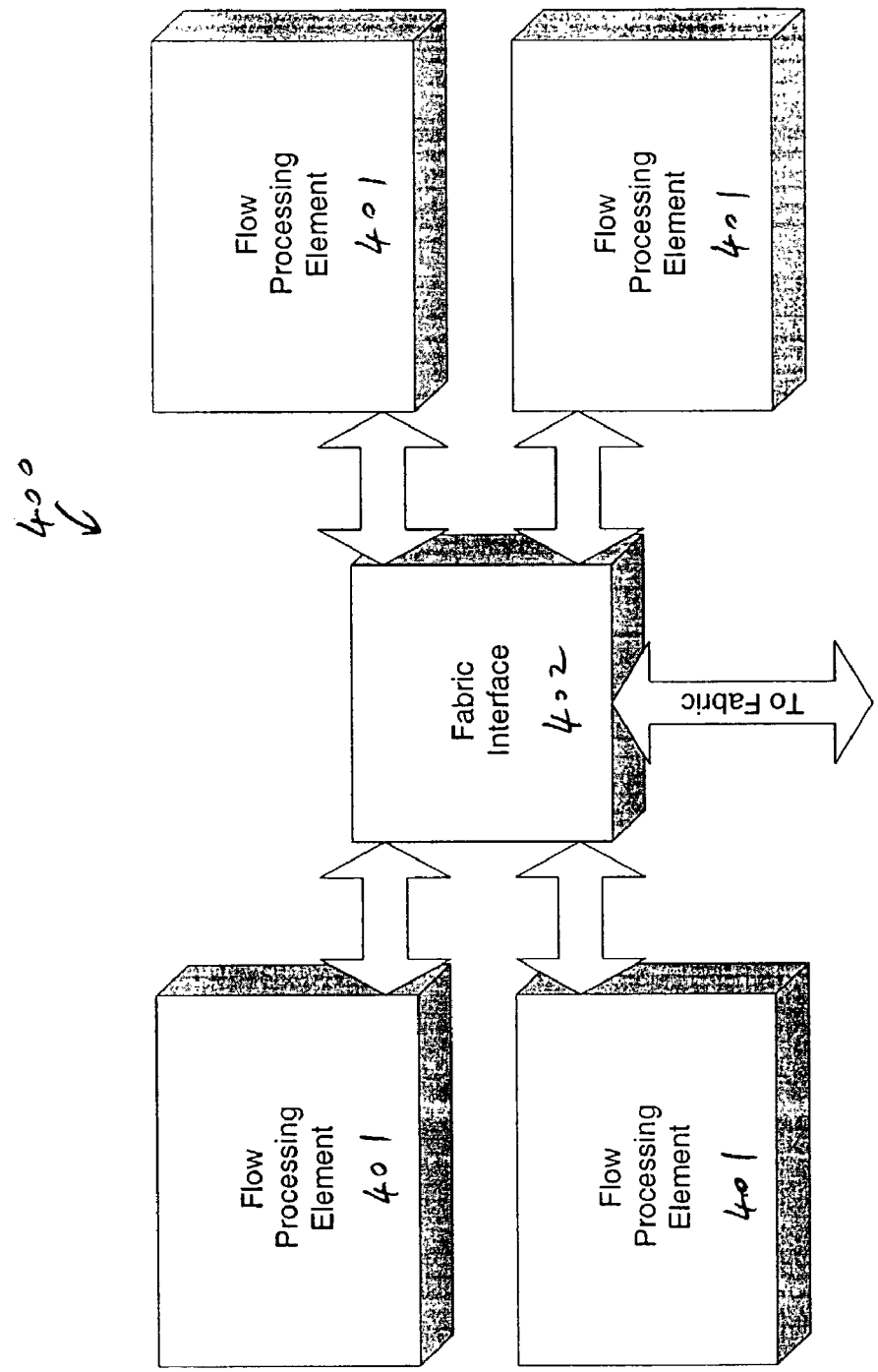
FIG. 4A shows a block diagram of an exemplary service processing module according to one embodiment of the invention.

FIG. 4A shows an exemplary block diagram of a service processing module (SPM), according to one embodiment of the invention. The SPM implements the packet processing for the system. Referring to FIG. 4A, an SPM contains one or more Service Processing Elements (SPE) 401. All of the SPEs are coupled through the fabric interface 402 to the fabric switches (not shown), which may be connected to other components of the system. Each SPE may consist of a general processor computer (GPC), such as a PowerPC, a hardware acceleration device, such as ASIC, and an optional cryptographic acceleration device. The packet processing is divided into two main categories: fast-path which is implemented through the hardware acceleration device, and slow-path which is implemented through the general processor computer, such as PowerPC.

The fast-path for packet processing is designed to be simple and fast, and packets in recognized flows that require simple processing should be handled without using the general processor computer (e.g., PowerPC). For slow-path packets, the hardware acceleration device (e.g., the ASIC) can assist the GPC by performing packet parsing and other low-level primitives for most packets. The packet headers and data will be placed in the GPC's memory. IML messages will be placed in the GPC memory without being modified.

Figure 4B:
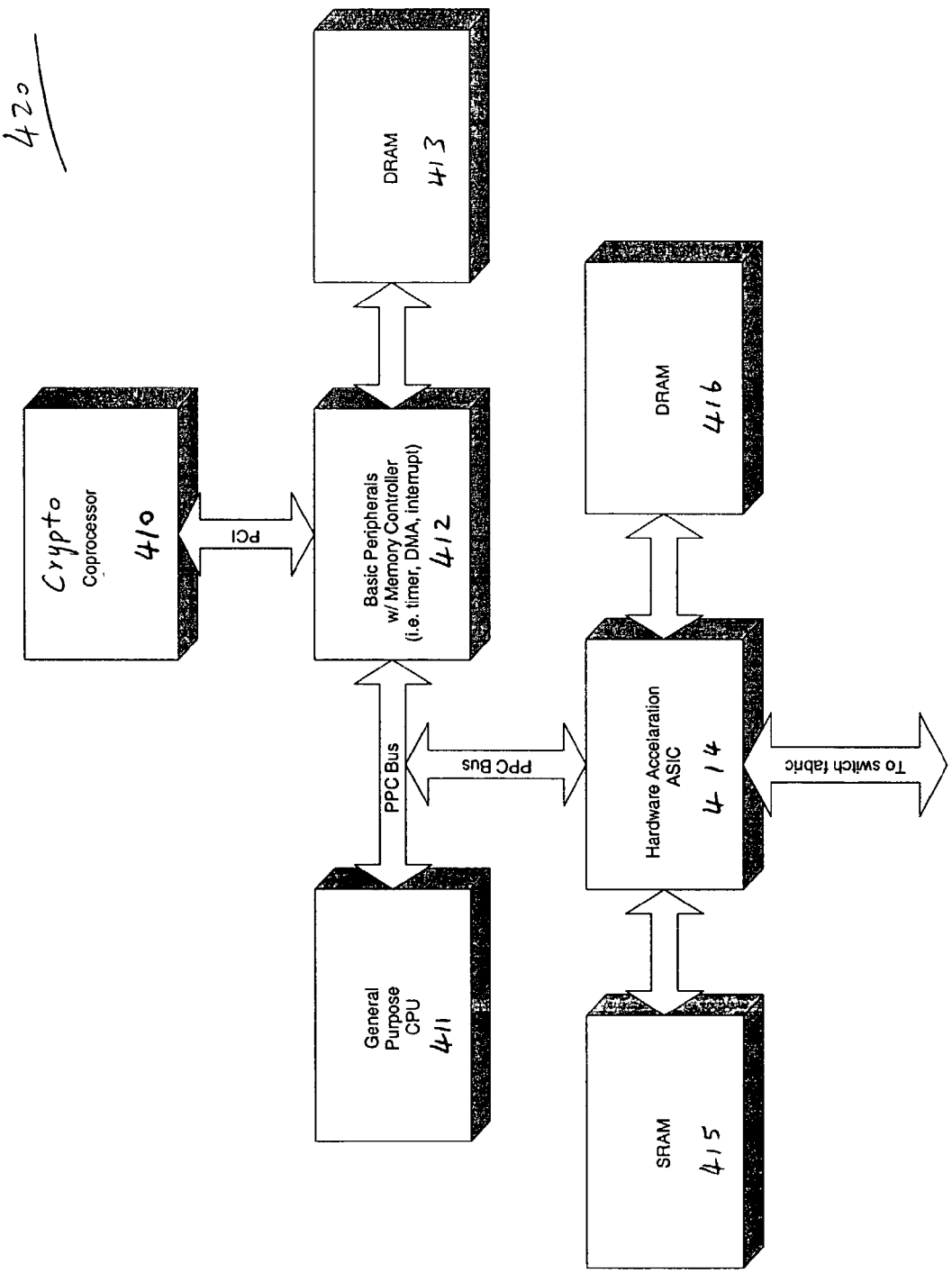
FIG. 4B shows a block diagram of an exemplary service processing module according to an alternative embodiment of the invention.

FIG. 4B shows an exemplary block diagram of an SPM, according to an alternative embodiment of the invention. The SPM includes a general purpose central processing unit (CPU) 411, basic peripherals 412 such as a north bridge (e.g., memory controller), a hardware acceleration device 414, optional coprocessor such as cryptographic device 410, and other memory such as static random access memory (SRAM) 415 and dynamic random access memory (DRAM) 413 and 416. In one embodiment, the general purpose CPU is a PowerPC processor, such as PPC 7400, from Motorola, Inc. Other CPU may be utilized. In one embodiment, the hardware acceleration device 414 may be implemented as an ASIC.

The GPC is responsible for receiving at least the first packet of a new flow and determining how the flow should be handled. Software running on the GPC determines which services should be applied to the new flow, and which, if any, fast-path operations should be used to handle further packets belonging to the flow.

The hardware acceleration device 414 contains the fabric interface, the fast-path packet processing, and the slow-path interface to the GPC. The fabric interface implements the segmentation and reassembly required to send packets across the cell-based switch fabric. The fast-path implements a set of primitives such as full and half network address translation (NAT), transmission control protocol (TCP) connection splicing, and internet protocol (IP) checksum recalculation, that are programmed for each flow that is placed on the fast-path. The slow-path interface is a PPC bus master that enables full access to the GPC DRAM. The hardware acceleration device also performs packet queuing per customer with token-based rate control. The GPC uses the switch fabric, such as switch fabric 203 of FIG. 2, and a message passing protocol to communicate with I/O Modules, Management Modules, and other SPEs.

Figure 4C:
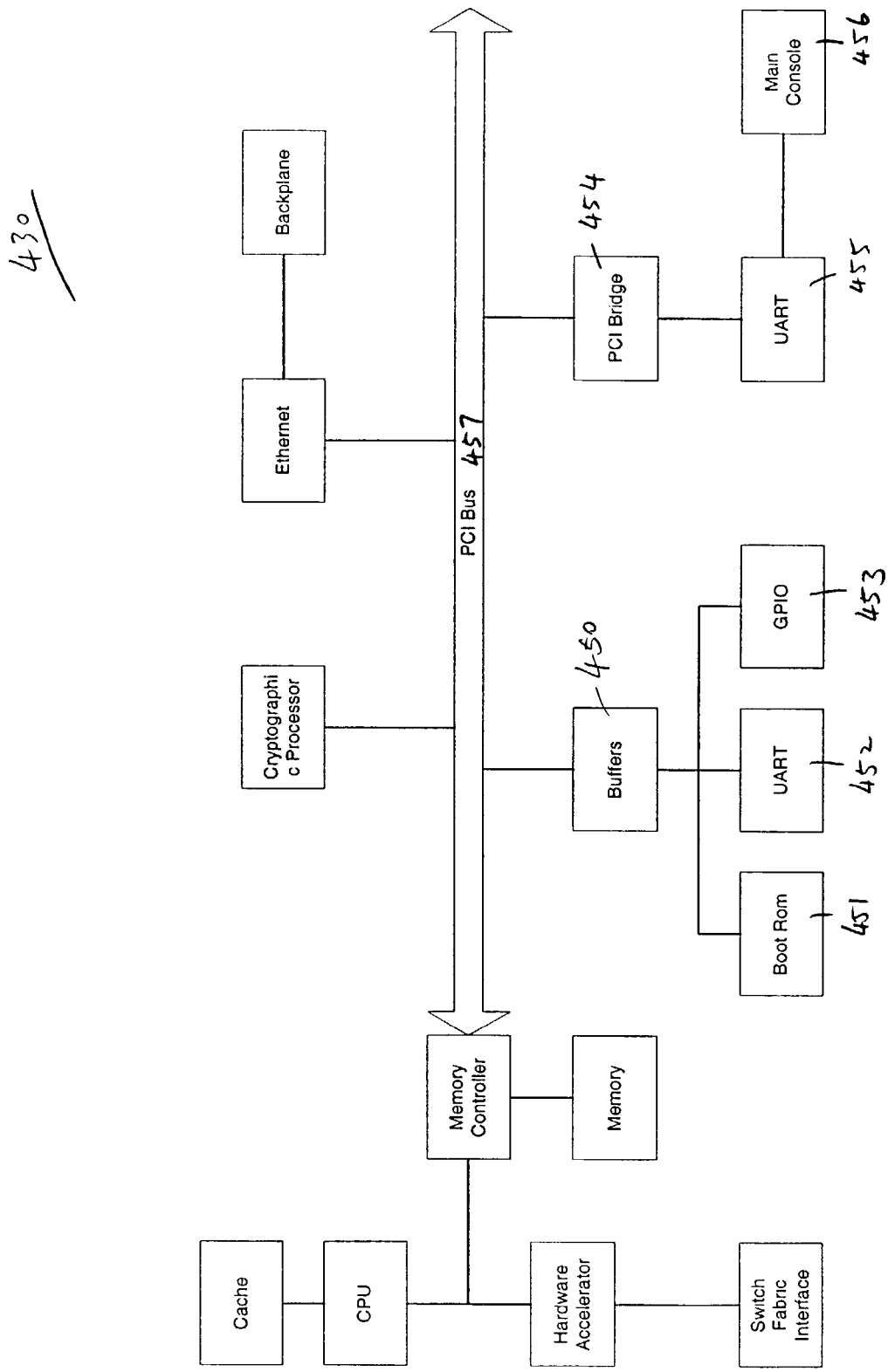
FIG. 4C shows a block diagram of an exemplary service processing module according to yet another alternative embodiment of the invention.
Figure 5:
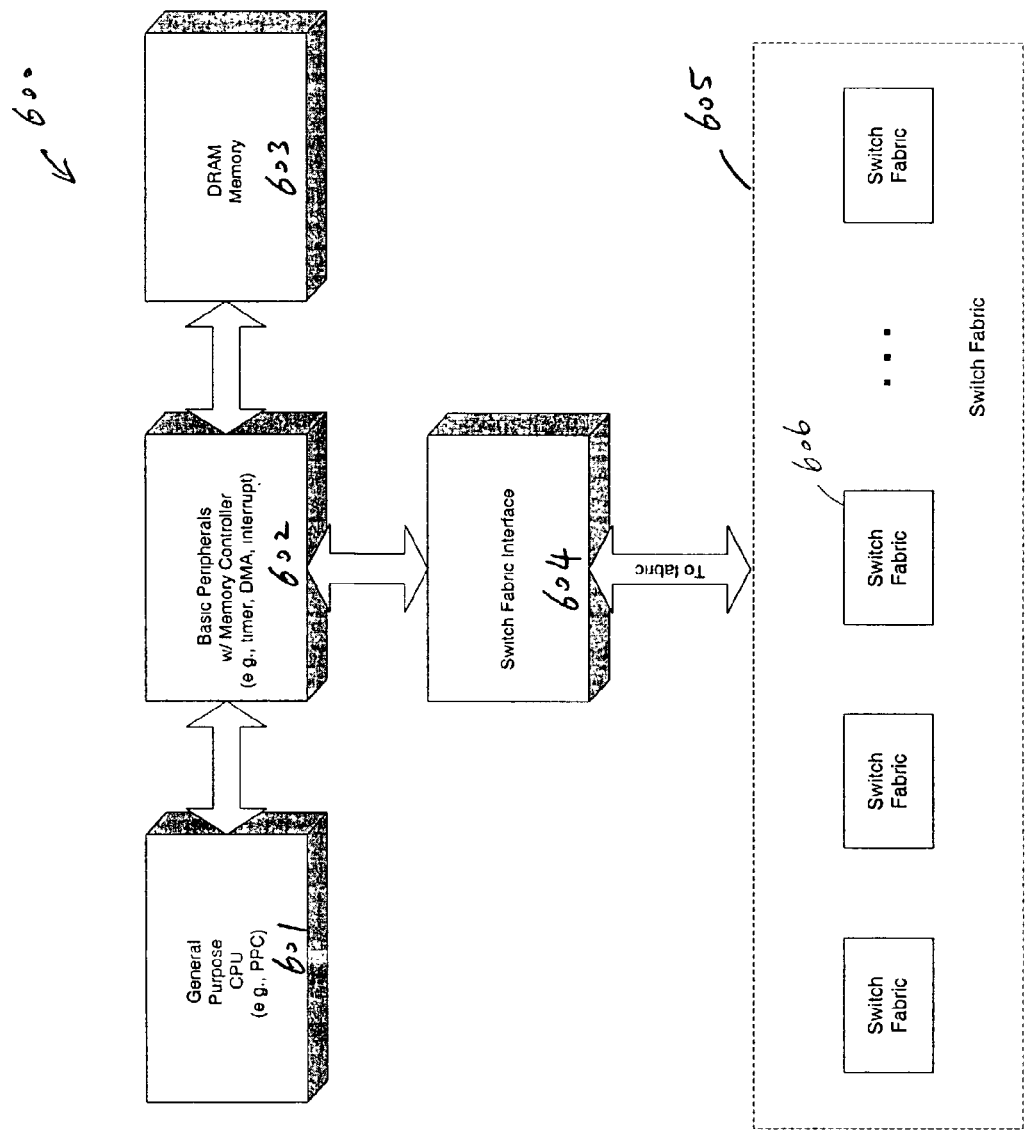
FIG. 5 shows a block diagram of an exemplary management module according to one embodiment of the invention.

FIG. 4C shows an exemplary block diagram of an SPM, according to yet another alternative embodiment of the invention. In addition to the system 420 shown in FIG. 4B, the system 430 also includes buffers 450 coupled to the peripheral component interface (PCI) bus 457. The buffers 450 may be used by the boot read only memory (ROM) 451 for initialization, by a universal asynchronous receiver/transmitter (UART) 452 for debug purpose, or by a general purpose input/output (GPIO) 453. Furthermore, the SPM may include another UART 455 coupled to the PCI bus through the PCI bridge 454. The UART 455 provides data to a remote terminal such as main console 456.

Figure 6:
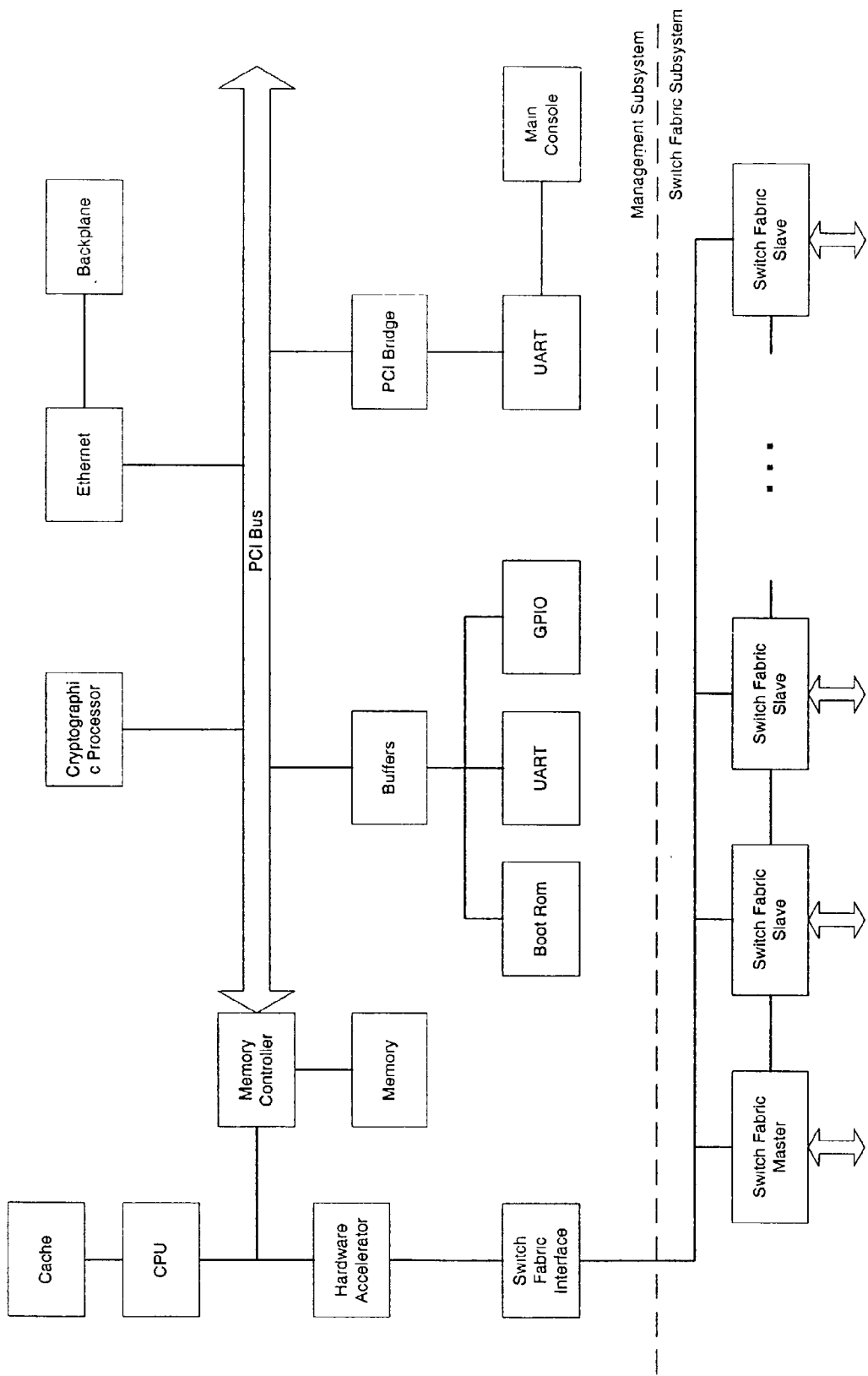
FIG. 6 shows a block diagram of an exemplary management module according to an alternative embodiment of the invention.

FIG. 6A shows a simplified block diagram of an exemplary management module according to one embodiment of the invention. In one embodiment, the management module 600 includes a general purpose CPU 601, basic peripherals 602 including memory controller, timer, direct memory access (DMA), and interrupt, DRAM 603, and a switch fabric interface 604. The management module is coupled to the switch fabric 605 through the switch fabric interface 604. In one embodiment, the management module 600 and the switch fabric 605 may be placed in the same physical board.

The Management Module 600 is responsible for overall system management processing. When an outside entity is "talking to the box," it's talking to the Management Module. The Management Module has the system IP protocol stack and the system IP address. The Management Module runs protocol modules such as simple network management protocol (SNMP) and hypertext transfer protocol (HTTP) that communication with other modules in the box to provide a complete system view for management applications.

The Management Module is a simple processor-memory subsystem. It connects to other modules in the system via the fabric 605 and the out-of-band connection. The management module also receives hardware interrupts whenever another card is inserted or removed from the system. This hardware notification is used to drive all reconfiguration events in the system, including dynamically changes of the functionality of a topology, or dynamic software upgrade (e.g., on-the-fly), which will be described in details further below. The Management Module is a centralized resource in the system and therefore has a hot-standby redundant module, such as standby management module 204 of FIG. 2. The active module (e.g., active management module 202 of FIG. 2), and the redundant module continuously monitor each other to determine whether the peer is present in the system and functioning normally. If any abnormalities are detected in the active management module 202 by the standby module 204, the standby module 204 takes control of the system and becomes the active module.

The switch fabric module 605 controls all data switching in the system. Its main purpose is to house the fabric silicon implementation (e.g., fabric 606). The system contains one or more switch fabric modules. The switch fabric is connected to other modules in the system through the system backplane. In one embodiment, there is at least one connection to each of the other modules in the system. Alternatively, there may be more than one depending on how the switch fabric is configured and the bandwidth needs of the other modules. The switch fabric module also connects to the system bus. Through the system bus, the management module and other processing modules can alter the behavior of the switch fabric. During most system operation, there is not much need to reconfigure the switch fabric. The switch fabric itself is implemented using an off-the-shelf fabric from a standard silicon supplier, which is well known in the art. Typical off-the-shelf fabrics implement either shared-memory or crossbar architecture. FIG. 6B depicts yet another simplified block diagram of a management module according to an alternative embodiment of the invention.

The present invention, in some embodiments, also introduces a virtual network topology model. In this model, according to one embodiment of the invention, the entire packet-processing functionality in the system is modeled as an abstract graph of connected virtual service module (VSM) nodes. A virtual service module is also called dynamic service module (DSM). Each VSM in the system is modeled roughly along the lines of individual network elements in the real world. For instance, a VSM may implement functionality approximately that of a standalone IP router, Ethernet switch, firewall, or load balancer. These elements are then composed in an arbitrary graph similar to the way they would be in the real world. Physical ports on the virtual network system are attached to the graph at various points and allow the internal, virtual system to be "hooked up" to the outside world. The graph may grow to be very large. The internal representation may come to replace most or all of a typical network data center. The size of the graph is limited only by RAM and processing power.

Figure 7:
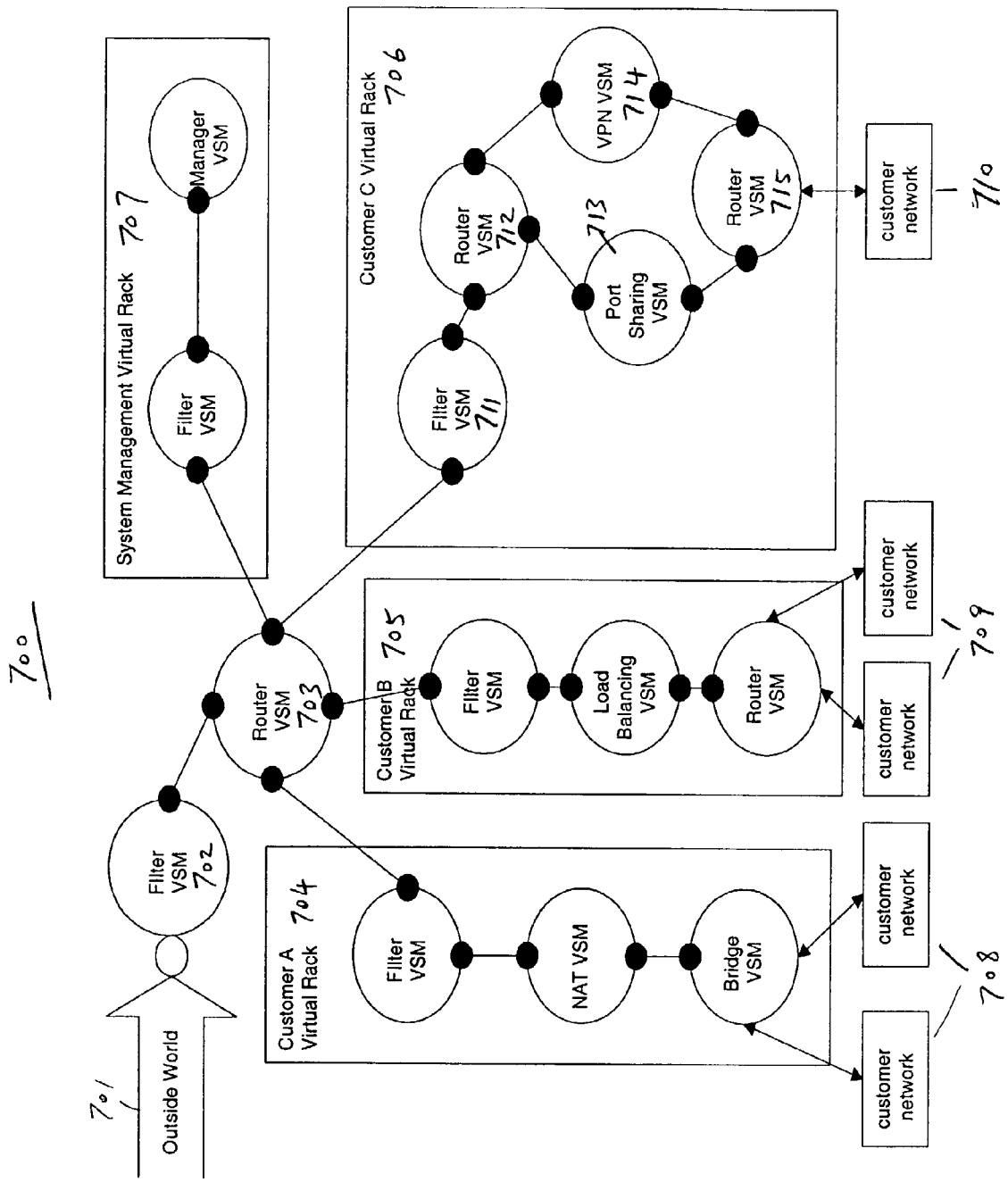
FIG. 7 shows an exemplary virtual network system according to one embodiment of the invention.

FIG. 7 shows an exemplary virtual network system according to one embodiment of the invention. The behavior of the virtual network system 700 is simply the equivalent behavior of an aggregation of standard network elements. The system 700 simulates the virtual network topology to produce the expected external behavior. In effect, the behavior of the virtual network system is simply the equivalent behavior of an aggregation of standard network elements. The virtual network system simulates the virtual network topology to produce the expected external behavior.

According to one embodiment of the invention, the behavior of the system is easy to visualize. Since the external behavior is identical to the same system built from real components, current network administrators and technicians have an existing mental model with which to work. This allows customers to approach the product without experiencing a difficult learning curve. In addition, configuration is more flexible since all components of the system can be dynamically configured and managed. The physical consideration such as location, power, and cabling are eliminated.

Further, the virtual network does not need Ethernet or any other computer-to-computer link layer protocol. Instead a Framework is used to provide a specialized data link layer between the virtual nodes. The Framework provides packet movement through the box so that virtual service modules (VSMs) can ignore data link layer and even IP layer unless the feature they're providing depends on manipulating or getting information from them.

Further, the system can be optimized more easily. Simplifying and virtualizing all the various network elements inside the virtual network system allows users to optimize the processing of individual packets by combining the actions of all the individual components. As long as the processing behavior as seen from outside the virtual network system is equivalent, any and all optimizations across the system are possible.

Virtual network components can be very lightweight. In some cases, they can be downright trivial, to the point that there is no real-world counterpart. For example, it would be impractical to build and market a real-world piece of network equipment with two ports that only forwards packets where both the source and destination addresses are prime numbers. In the case of virtual components living inside the virtual network graph topology, this functionality is implemented easily. Components can be as lightweight as needed. Interesting and strange behaviors can be created at will to satisfy the most aspects of requirements.

The virtual network topology model models the entire packet-processing functionality in the system as an abstract virtual graph of connected Virtual-Service-Module nodes. Each Virtual-Service-Module in the system is modeled roughly along the lines of individual network elements in the real world. For instance, a Virtual-Service-Module may implement functionality approximately that of a standalone IP router, Ethernet switch, firewall, load balancer, etc. These elements are then composed in the virtual graph similar to the way they would be in the real world. The composition and topology of the modeled network elements may be arbitrarily assembled based upon a particular customer's desires. Physical ports on the NSE system are attached to the virtual graph at various points and allow the internal virtual system to be coupled to the outside world. In an embodiment, a virtual rack is a logical receptacle for multiple network-resident application services, and is analogous to a physical rack of network appliances.

A network system where variable functionality representing discrete "services" is composed into an arbitrary topology where packet processing is governed by the configured virtual graph of network services. A virtual graph includes the configured relation of VSMs to each other throughout the box. As each related packet flow is introduced to the system, the support software framework walks the VSM graph to create a sequential node list for that flow.

A network system where nodes in the virtual graph are associated with a given network customer and resources are managed for each node in the system according to the customer assignment. Different customers have reserved resources and the exhaustion of resources for one customer does not affect the service levels seen by a second customer.

A user can populate a virtual rack with one or more service instances in a particular service topology and manage them as a single unit within the system. Most importantly, the virtual rack forms a fundamental resource management boundary around the services. The system resources are managed to guarantee that each virtual rack receives its fair share of the system, and that a disruptive event occurring in one virtual rack does not affect other virtual racks in the same system.

Referring to FIG. 7, the virtual network system 700 includes multiple virtual racks for varieties of customers, such as customer A virtual rack 704, customer B virtual rack 705, and customer C virtual rack 706. A virtual rack is a software container for grouping several virtual service modules (VSMs) to simulate the physical rack of a network system. A VSM represents a functional block or a daughter board plugged on a rack of a back plane in a real physical network system. In one embodiment, a VSM is a binary file containing executing code, installation information, versioning information, and dependency information. VSMs are installed on the system through management interfaces. A VSM might take the form of a Java Archive (e.g., "jar" file) containing one or more Java class files and other information necessary for the management system to install the VSM correctly. Further, VSMs are composed of multiple modules that run on the system management module, such as management module 202, and service processing modules such as service processing modules 205 of FIG. 2.

For example, according to one embodiment of the invention, virtual rack 706 represents a physical rack in a network system that is plugged in a slot of a backplane. The virtual rack 706 may include a filter VSM 711, a router VSM 712, a port sharing VSM 713, a virtual private network (VPN) VSM 714, and another router VSM 715. Each of these components may be dynamically loaded or unloaded subject to the configuration specified by the corresponding customer. In one embodiment, the corresponding customer may specify or configure the virtual rack 706 through a user interface of the management virtual rack 707. Multiple instances of the VSMs may be loaded simultaneously, such as router VSMs 712 and 715.

In addition, according to one embodiment of the invention, the multiple instances of VSMs may contain different versions. For example, router VSM 712 may have different version than the router VSM 715. Each VSM can be changed or upgraded individually without disrupting other services of the other VSMs. The topology of the virtual rack may be changed in terms of functionality without disrupting the services being served, which will be described in further details below. Thus, when a topology is changed or a VSM is upgraded, it would not be noticeable to the end users.

Furthermore, each virtual rack operates independently without any interference with other racks. For example, if the virtual rack 705 crashes, other virtual racks 704 and 706 would not be affected. As a result, virtual racks 704 and 706 may continue to operate, while the virtual rack 705 rebooting itself for recovery. The resources between the virtual racks are managed at the hardware level such that each virtual rack is guaranteed to have sufficient resources to operate. Thus failure of one virtual rack would not contaminate other racks' operations.

Figure 8:
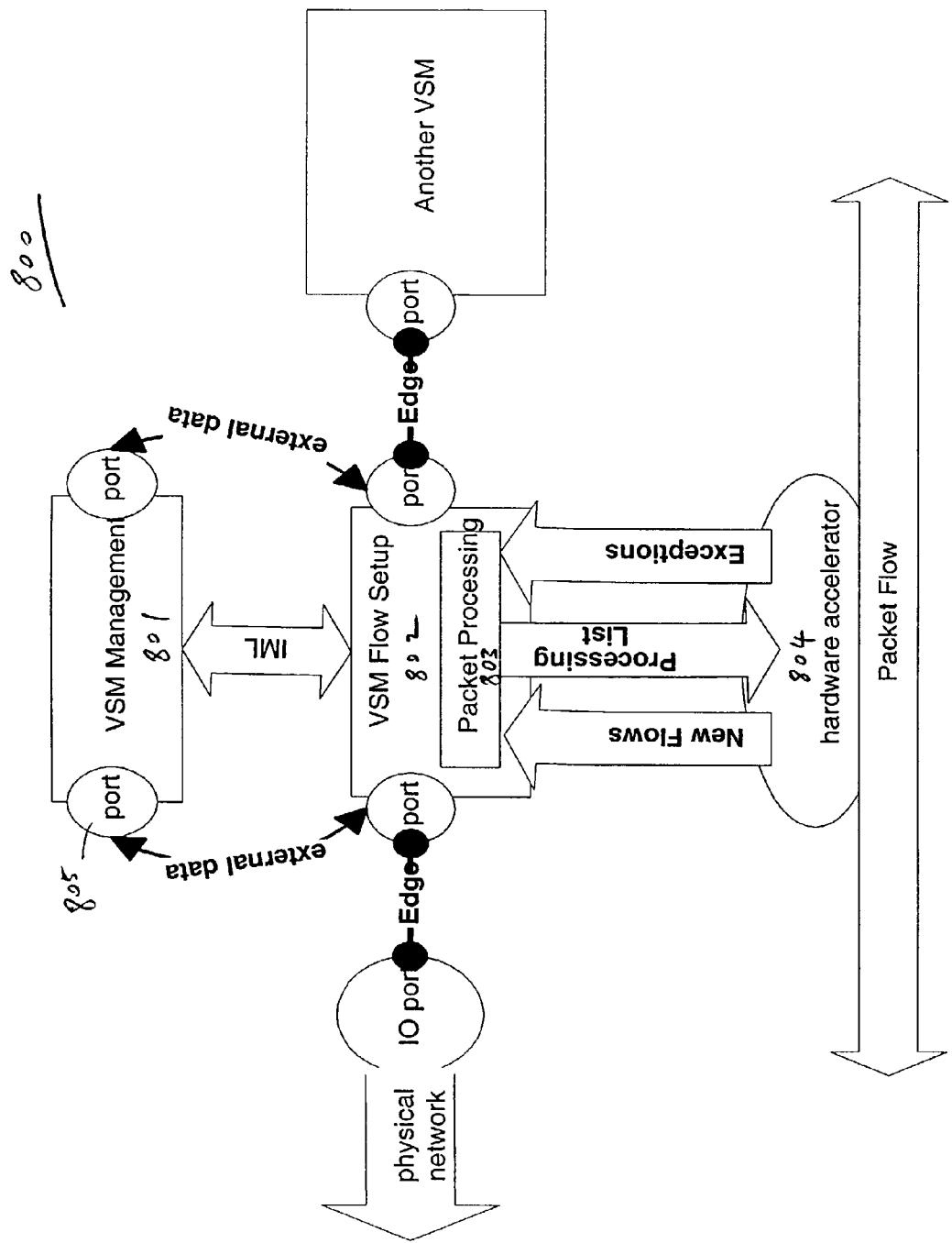
FIG. 8 shows an exemplary of a virtual service module (VSM) according to one embodiment of the invention.

FIG. 8 shows an exemplary of a virtual service module (VSM) according to one embodiment of the invention. In an embodiment, each service module is a self-contained module of data and its associated processing software that has an archive file containing both executable code as well as metadata that integrates the service module with the network system. Each service module may model a discrete network element such as a firewall, a filter, a load balancer, a router, etc.

In one embodiment, a Virtual-Service-Module may belong to an object class in which one or more instances of each Virtual-Service-Module may exist. Objects are independent program modules written in object-oriented programming languages. Objects are software components structured to plug into and work with each other at runtime without any prior linking or pre-compilation as a group. One or more instances of particular type of Virtual-Service-Module may be created. For example, the class of Virtual-Service-Modules modeled to represent firewalls may have multiple instances of that Virtual-Service-Module plugged into multiple customers' virtual racks throughout the virtual graph. However, one or more instances of each VSM may exist as part of the virtual network graph. Classes are created in hierarchies, and inheritance allows the knowledge in one class in, a layer higher in the hierarchy to be passed down to another class lower in the hierarchy (sub-class).

Virtual-Service-Modules may be packaged in separate binary images. The image contains an archive file of both executable code as well as metadata that integrates the Virtual-Service-Module with the system. The meta data includes information that describes the various configuration parameters supported by the Virtual-Service-Module and any specific commands required to configure the module through the command-line interface (CLI). Using this information, the network system can easily integrate the Virtual-Service-Module without the user known what functionality is "built-in" to the base system and what has been added later. In an embodiment, extended markup language (XML) may be used to format the meta data.

Referring to FIG. 8, in one embodiment, each VSM instance includes multiple cooperating parts. The VSM 800 may be considered as a high-level abstraction of multiple sub-parts including a management component 801, a flow setup component 802, and a packet processing component 803. The VSM instance 800 also has ports 805 that describe its relation to other components. The ports are used by both the management component 801 and the flow setup component 802.

The management component 801 is responsible for interfacing with the various management interfaces common to the virtual network system. This component also maintains any global information required and gathers information by communicating with external entities such as routers and authentication authorities.

The flow setup component 802 is the part of a VSM that actually exists "within" the virtual network graph. It is the part of the VSM responsible for first-packet processing, determining the path through the virtual network graph and building the action list for the flow.

The packet processing component 803 is an abstract piece of the VSM. The packet processing component 803 may contain an action list programmed into the hardware accelerator, such as hardware acceleration ASIC 414 of FIG. 4B. VSMs that require processing beyond what standard primitives can accomplish would continue to process the packets in the flow setup component. A VSM that starts each flow as this type of extended flow setup can bind an action list at any time, but it may be fairly common for some VSMs to process the entire flow without ever switching to hardware assist (e.g., hardware accelerator). In one embodiment, even after a VSM has bound an action list, the VSM may handle exception conditions reported from the action list in order to handle the more complicated processing sometimes required for infrequent events.

Each of the VSM components may be mapped to a different physical board in the system. In one embodiment, management module (MM) may include the switch fabric hardware. Service processing module (SPM), which is also called flow processing module, may contain one or more service processing engines (SPEs). Each engine may be made up of a general purpose processor and the packet-processing hardware accelerator (e.g., hardware acceleration ASIC 414 of FIG. 4B). I/O module (IOM), such as I/O module 201 of FIG. 2, may support one or more external I/O ports via one or more I/O engines (IOEs). The engines may be made up of a network processor controlled by a general purpose processor. In one embodiment, the network processor may be Vitesse network processor from Vitesse Semiconductor Corporation, and the general purpose processor may be a PowerPC PPC7400 CPU from Motorola, Inc. Other vendors' processor may be utilized.

In one embodiment, the management component of the VSM runs on the MM. The flow setup component runs on a GPP on one of the FPEs. Packet processing is handled in hardware acceleration ASIC such as ASIC 414 of FIG. 4B, with special cases handled via exceptions passed to the GPP. VSMs are unaware of IOEs and instead interact with objects on the FPE that represent both physical and logical I/O ports. The various components of the VSM communicate through application programming interfaces (APIs) provided by the system software. The APIs abstract the communication path such that the modules do not know how the communication is implemented.

The flow setup component performs initial packet-processing, determining the packet path through the virtual network graph, and building an action list for the flow. Flow may be a particular stream of related packets. For example, the stream of data a server sends to a client over a particular TCP connection is a flow.

The packet-processing component is an abstract piece of the Virtual-Service-Module. For Virtual-Service-Modules that can utilize standard processing primitives provided by the virtual network system, the packet-processing component consists of the action list programmed into the hardware accelerator. Virtual-Service-Modules that require packet processing beyond what standard primitives in the packet-processing component can accomplish would continue to process the packets in the flow set-up processing component. A Virtual-Service-Module that starts each related packet flow as this type of extended flow setup can bind an action list at any time, but it will be fairly common for some Virtual-Service-Modules to process the entire related packet flow without ever switching to hardware assist.

Action list is a list of processing primitives that a Virtual-Service-Module wants applied to each packet in a given related packet flow. Processing primitives are a single, primitive packet transformation operation. For instance, decrementing the IP TTL field or recomputing the IP checksum fields are each processing primitives. A combined action list is the concatenation of each Virtual-Service-Module's action list for all the nodes in a given sequential node list. A common action list is a global action list applied to all arriving packets. An optimized action list is the combined action list after it has been optimized.

Even after a Virtual-Service-Module has bound an action list, the flow set-up component of the Virtual-Service-Module can handle exception conditions reported from the action list in order to handle the more complicated processing sometimes required for infrequent events. One or more Virtual-Service-Modules instance also have ports that describe its relation to other components and have interfaces to communicate with components external to the virtual network system. The ports are used by both the management component and the flow setup component.

Figure 9:
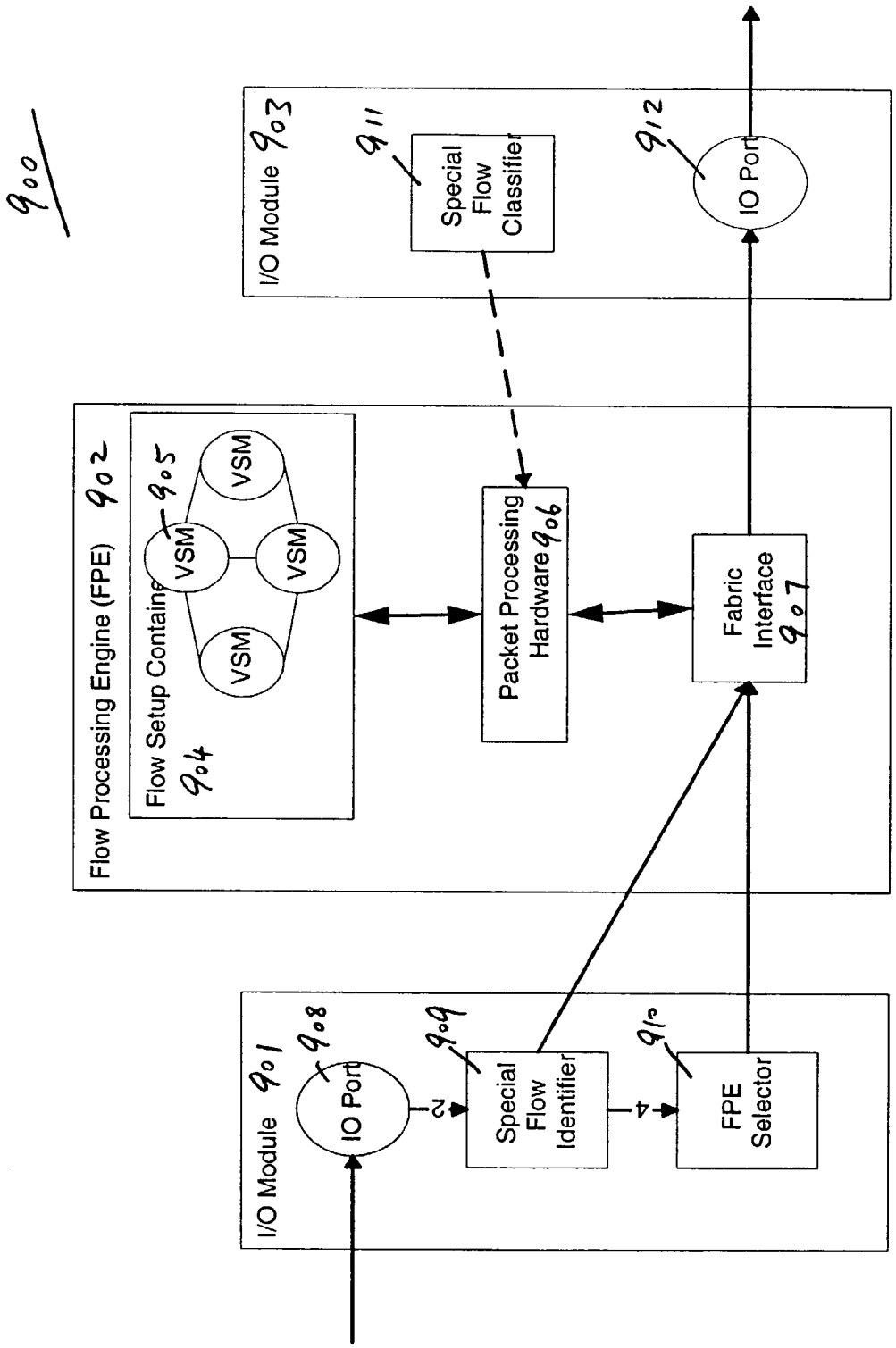
FIG. 9 shows an exemplary flow setup processing diagram according to one embodiment of the invention.

FIG. 9 shows an exemplary flow setup processing diagram according to one embodiment of the invention. In one embodiment, the system 900 includes an I/O module 901, a service processing module (e.g., flow processing module) 902, and another I/O module 903. The SPM 902 includes a flow setup container 904, which may include multiple VSMs 905, a packet processing hardware 906, and a fabric interface 907. The I/O module 901 includes an I/O port 908, a special flow identifier 909, and a service processing element selector 910. The I/O module 903 includes a special flow classifier 911 and an I/O port 912.

Referring to FIG. 9, in one embodiment, the packet arrives at the input port (e.g., I/O port 908) at the I/O module 901. The packet is passed to the special flow identifier 909 assigned to handle traffic from that particular port. Typically, the I/O module 901 is not aware of specific flows and does not find a match in its tables, but when the flow identifier 909 does find the specific flow, it forwards the packet directly to the indicated SPE. If a specific flow was not found, the packet is handed off to the SPE selector 910 for SPE selection.

SPE selector 910 selects an SPE by applying an algorithm to the packet's addressing information such that it evenly distributes flows among the SPEs in the system. The algorithm selects the same SPE for the same flow. The I/O module 901 then sends the packet to the selected SPE through the system's switch fabric 907.

The SPE's fabric interface 907 delivers the packet to the packet-processing hardware 906 where the common action list is applied to it. For a new flow or one that is not entirely bound, the packet-processing hardware 906 does what it can and then passes the packet to the flow setup container 904.

For a previously unrecognized flow, the flow setup container 904 determines the path of the packet through the virtual network graph. As VSMs on the flow path bind (i.e., produce action lists), the flow setup container 904 instructs the local packet-processing hardware 906 how to handle the subsequent packets of the flow. The flow setup container 904 gives the packet-processing hardware the combined action list for the parts of the flow that are bound. Once all the VSMs bind, flow setup will optimize the final combined action list, after which the flow will be handled entirely by the hardware acceleration hardware 906. Not all flows, however, will have all VSMs bind, meaning that at least some part of the packet processing has to be handled by the more sophisticated yet slower flow setup software.

Once the packet has been processed, whether by hardware (e.g., the fast path) or software (e.g., the slow path) or a combination of both, the packet-processing hardware 906 passes it back to the SPE's fabric interface 907. The fabric interface 907 transmits the packet over the fabric to the correct I/O port, such as I/O port 912, on the outbound I/O Module 903.

The special flow classifier 911 monitors outbound packets and recognizes the special case where returning packets will not automatically be sent to the SPE handling the flow. In that case, it adds the flow and the destination SPE to its special flow list. When a packet on the reverse flow arrives, it will be forwarded to the SPE handling,the forward flow. At the egress I/O port, the I/O module strips off all the associated internal fabric routing information and sends the packet out on the wire.

In some cases, in order to make a service decision, a VSM may require information that is not present in the first packet of the flow. In these cases, the VSM cannot create low-level processing functionality to be executed by the fast-path until it has resolved the high-level dependency. This process is called "late binding" because the flow path through the VSM chain graph cannot be resolved, or bound, until later in the flow lifecycle. In other case, any flow providing that feature will never be entirely bound, and part of the flow will be handled by the flow setup component of the feature's VSM.

Different VSMs may make binding decisions at different points in the flow lifecycle. For example, a firewall VSM doing simple port-level filtering can make a very early binding decision. It decides whether to admit the flow or not based on the TCP port number in the first packet.

To achieve hardware acceleration even in the face of late binding, in one embodiment, each packet of each flow is processed as much as possible by any action lists bound by the leading VSMs in the sequential node list. Packets are processed through at least the default action list that the hardware accelerators apply to all packets. As VSMs at the beginning of the sequential node list bind action lists, the hardware acceleration will do more and more of the processing. After the initial bound action list processing is completed, the packet will be passed to the general purpose processor (GPP) for further processing, starting with the first unbound VSM in the sequential node list. Alternatively, software running in the GPP can execute action lists bound by VSMs that follow the first unbound VSM. This allows a VSM to bind at any time, but its action list will be simulated in software until all the earlier VSMs have also bound.

Figure 10:
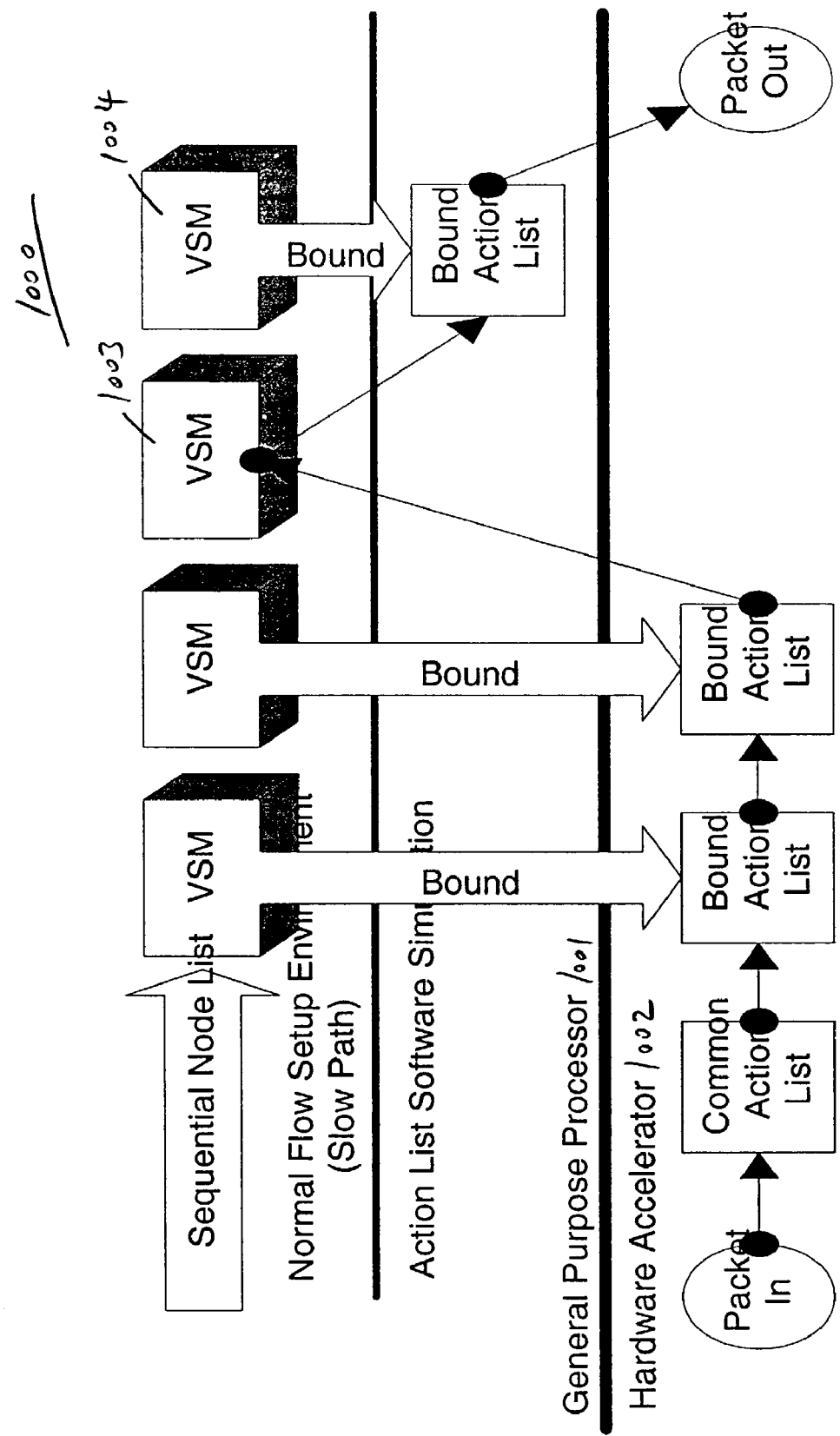
FIG. 10 shows an exemplary action list processing diagram according to an embodiment of the invention.

FIG. 10 shows an exemplary action list processing diagram according to an embodiment of the invention. In one embodiment, the system 1000 includes a GPP 1001 which constitutes a slow path and a hardware accelerator 1002 which constitutes a fast path. Each packet is handled by hardware accelerator 1002 as far as possible, but once an unbound VSM (e.g., VSM 1003) is encountered, the accelerator 1002 forwards it to the GPP 1001 for further processing. Once a packet is passed to the GPP 1001, its processing remains there even if subsequent VSMs (e.g., VSM 1004) are bound. This allows the system to avoid the complicated and expensive problem of moving a packet back down to the hardware layer when it is only partially processed, yet still allows VSMs to bind whenever they want without needing to know whether their actions are being performed by hardware or simulated in software. The action lists could be combined and optimized as soon as they are chained together.

As discussed above, a virtual service module (VSM) can be changed or upgraded dynamically without disrupting the services being served. According to one embodiment of the invention, a multiple board system called virtual services switch is utilized. The system has a management processor, several flow processors and IO processors connected by a switch fabric in normal use, as shown in FIG. 2. In high availability mode, the system may have two management processors and two switch fabrics. In this system, the racks in a data center are represented as virtual racks. Each virtual rack has a virtual network graph. The devices in a rack are represented as nodes on the virtual network. A node has as many ports as a device on a rack can have. The wires connecting the devices are represented as edges of the graph. The system supports multiple virtual racks connected by the system nodes and IO ports. The connected big graph of virtual racks, system nodes, and IO ports is created and replicated in management and flow processors.

Each node runs a virtual services module (VSM) which provides a service like load balancing, firewall etc., in a same way as a device on a physical rack. Each VSM has a management component, which runs on the management processor and a flow processing component which runs on flow processors. Management component of a VSM gets configuration and carries out the device management part. Flow processing component of a VSM processes the packets given to it. Each VSM in a node runs within a framework, which provides several system services like communication between the management and flow processing components of the VSM. Framework also delivers packets to the VSM connected to an IO port in the graph when it receives a packet from the IO port. Packets flow through the graph through the edges. VSM decides to which edge to send the packet. Framework passes the packet to the next node in the graph.

The VSM in a virtual rack can be can be upgraded without disrupting the service being provided by that VSM. When a VSM is upgraded in a node, another instance of the VSM is created. Framework delivers a packet to the same instance of VSM, which handled the flow the packet belongs to. Framework gets the VSM instance from the context maintained for each flow. It delivers the first packet in a new flow to the new instance of the VSM and sets the flow context accordingly. Both old and new instances of the VSM can coexist until the upgrade is completed. Upon the completion of the upgrade, the older instance is terminated and removed from the node. An upgrade is considered complete if one of the completion conditions specified in the upgrade operation is reached. Upgrade proceeds until the number of flows through the older instance reaches the value specified or until a certain time elapsed. A VSM can be downgraded by a similar procedure as described. An upgrade may be aborted before the completion conditions are reached.

Figure 11A:
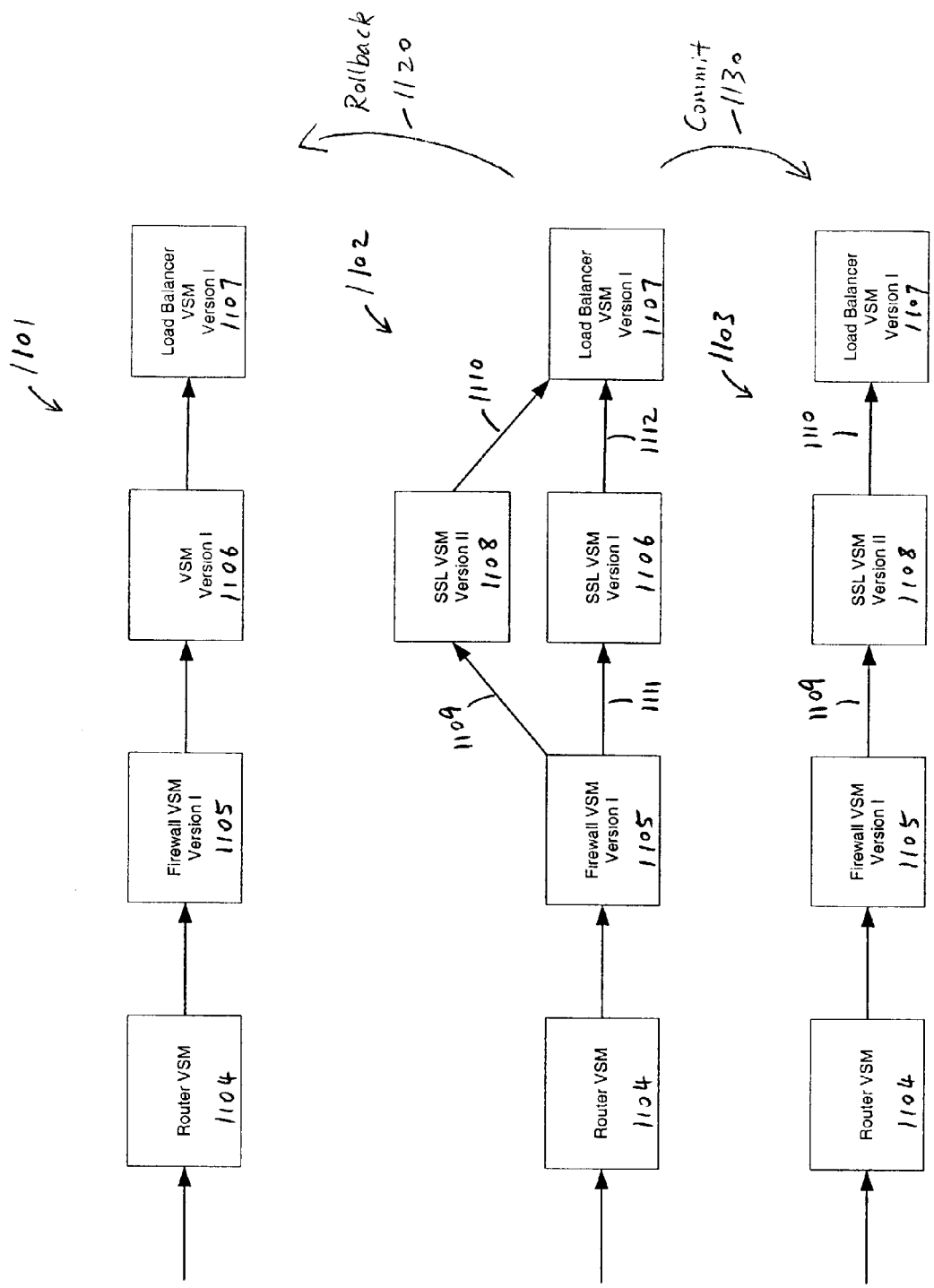
FIG. 11A shows a block diagram of dynamic change/upgrade of a topology in a virtual network system according to one embodiment of the invention.

FIG. 11A shows an exemplary block diagram illustrating an upgrade of a VSM according to an embodiment of the invention. Referring to FIG. 11A, in one embodiment, an initial configuration 1101 of a topology processes a data flow through router VSM 1104, a firewall VSM 1105, a secure socket layer (SSL) VSM version I 1106, and a load balancer VSM 1107. When an upgrade request of SSL VSM is received (e.g., through a user interface of the management virtual rack), another instance of SSL VSM version II 1108 is launched. Once the SSL VSM version II 1108 is launched, the system connect the SSL VSM 1108 to the firewall VSM 1105 through the edge 1109 and to the load balancer VSM 1107 through the edge 1110. Thus, the SSL VSM version II 1108 and the SSL VSM version I 1106 are running in parallel, as shown in configuration 1102.

The system then directs any new flow data to the newly executed SSL VSM version II 1108. The SSL VSM 1108 processes the new data flow and transmit the data to the load balancer VSM 1107 thereafter. At the mean while, the system continue direct the existing data flow to the SSL VSM version I 1106. This parallel processing continues until certain conditions are satisfied. In one embodiment, the condition may be a pre-specified amount data of existing flow needed to be processed. In an alternative embodiment, the condition may be a pre-specified period of time.

According to one embodiment of the invention, anytime before the condition is satisfied, the upgrade may be aborted instantaneously. In one embodiment, such abortion request may be inputted through a user interface of a management module (e.g., interface of the management virtual rack), such as manage module 600 of FIG. 6 discussed above. Other channels may be used to receive such request.

Once the conditions are satisfied, the system directs all of the traffics to the new SSL VSM 1108. Once the SSL VSM 1108 stabilizes, the system disconnects the edges 1111 and 1112 between the SSL VSM 1106 and the firewall VSM 1105 and load balancer VSM 1107 respectively. Thereafter, the SSL VSM 1106 is terminated and removed from the graph, as shown in configuration 1103. As a result, SSL VSM service has been upgraded dynamically and the services being provided originally by SSL VSM 1106 is not disrupted. The processes transitioning the graph from configuration 1102 to 1103 is also called commit operation 1130.

As discussed above, anytime before the condition is satisfied, the upgrade may be aborted instantaneously. When the upgrade is aborted, the system directs all the new flow data to the old service, such as SSL service 1106. The system then disconnects the edges 1109 and 1110. As a result, the corresponding virtual rack is reverted back 1120, to its original configuration before the upgrade was completed. This process is also called rollback process. All the flows started going through the SSL service 1108 are terminated by the system. The old flows that were going through SSL service 1106 will continue to go through without any changes. If the abortion request is not received prior to the condition satisfied, the new SSL VSM will take over the old SSL VSM 1106. As a result, the configuration of the graph has been committed 1130 from configuration 1102 to 1103.

Figure 11B:
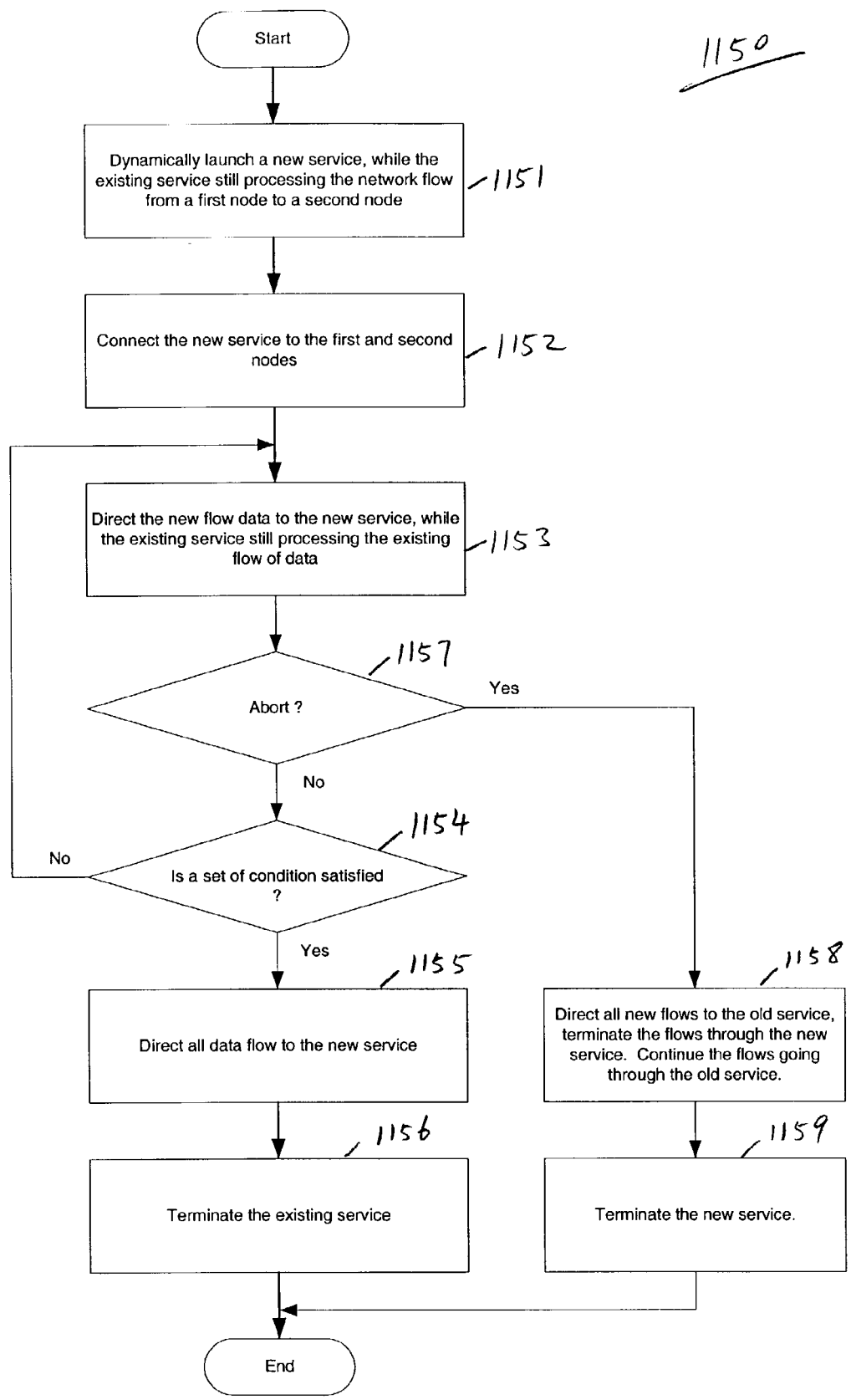
FIG. 11B shows a flow chart illustrating an exemplary processing of dynamic change/upgrade of a topology in a virtual network system according to one embodiment of the invention.

FIG. 11B shows a flowchart illustrating an exemplary method of upgrading a VSM according to an embodiment of the invention. In one embodiment, the method illustrates processing a request for changing a first node having a first service connecting with a second node and a third node in a network environment. The method 1150 includes dynamically launching a second service at the first node, connecting the second service with the second and the third nodes, directing requests for service to the second service, and terminating the first service. In an alternative embodiment, the method further includes determining whether the requests for service come from a new session of data, transmitting the requests for service to the second service if the requests for service come from a new session of data, and transmitting the requests for service to the first service if the requests for service come from an existing session of data.

Referring to FIG. 11B, when an upgrade request is received, at block 1151, the system dynamically launches a new service (e.g., an instance of a VSM with upgraded version), while the existing service (e.g., the existing VSM needed to be upgraded) still processing the data flow from a first node to a second node. At block 1152, the system connects the new VSM to the first and second nodes. At block 1153, the system then directs the new flow of data to the new VSM, while directing the existing flow of data to the existing VSM for processing. Thus the new and existing flows of data are processed in parallel by the new and existing VSMs respectively. At block 1154, the system checks whether a pre-specified condition has been satisfied. In one embodiment, the condition may be an amount of existing flow of data remains to be processed. In an alternative embodiment, the condition may be a period of time remained. Other conditions may be utilized. The parallel processes continue until the condition is satisfied. Once the condition is satisfied, at block 1155, the system directs all data flows to the new VSM and terminates the existing VSM at block 1156.

As discussed above, anytime before the condition is satisfied, the upgrade may be aborted instantaneously. If an abortion request is received at block 1157, before the condition is satisfied, the configuration of the graph is rolled back to its original configuration. In one embodiment, at block 1158, the system directs all new flows to the old service (e.g., SSL VSM 1106), terminates the flows through the new service (e.g., SSL VSM 1108), and continues the flows going through the old service, such as SSL VSM 1106. Thereafter, at block 1159, the system terminates the new service (e.g., SSL VSM 1108) to complete the rollback operation.

Conventionally changing topology of the devices in a rack will disrupt the services provided by the rack. According to an embodiment of the invention, the topology of the virtual rack can be changed dynamically without disrupting the services provided by any of the nodes in the virtual rack. A node can be added or deleted from a virtual network graph. When a node is added in a virtual network graph, it replaces an edge with a node and two edges. Framework keeps both the old edge and the new node until the topology change is completed. Framework delivers a packet to the same edge, which handled the flow the packet belongs to. Framework gets this information from the flow path maintained for each flow. It delivers the first packet in a new flow to the edge going to the new node and sets the flow path accordingly. Upon the completion of the topology change, the old edge is removed from the graph. A topology change is considered complete if one of the completion conditions specified in the process is reached. The topology change process proceeds until the number of flows through the older edge reaches the value specified or until a certain time elapsed.

Figure 12A:
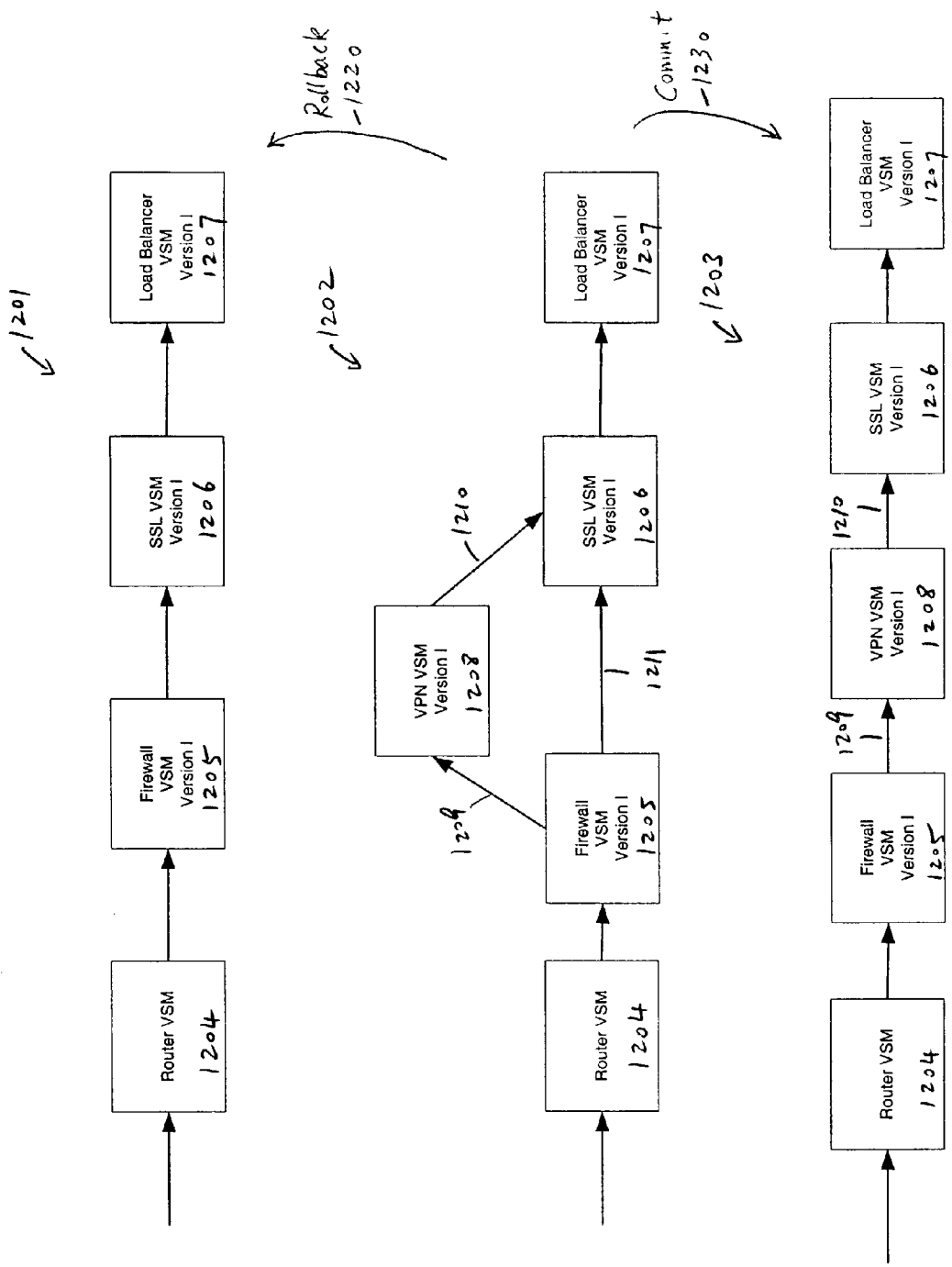
FIG. 12A shows a block diagram of dynamic change/upgrade of a topology in a virtual network system according to an alternative embodiment of the invention.

FIG. 12A shows an exemplary block diagram illustrating changes of a topology of a virtual network system according to an embodiment of the invention. Referring to FIG. 12A, in one embodiment, an initial configuration 1201 of a topology processes a data flow through router VSM 1204, a firewall VSM 1205, a secure socket layer (SSL) VSM 1206, and a load balancer VSM 1207. When a change request (e.g., adding a VPN VSM to the graph) is received (e.g., through a user interface of the management virtual rack), an instance of VPN VSM 1208 is launched. Once the VPN VSM 1208 is launched, the system connect the VPN VSM 1208 to the firewall VSM 1205 through the edge 1209 and to the load balancer VSM 1207 through the edge 1210. Thus, the VPN VSM 1208 and the edge 1211 connecting VSM 1206 and VSM 1205 are running in parallel, as shown in configuration 1202.

The system then directs any new flow data to the newly executed VPN VSM 1208. The VPN VSM 1208 processes the new data flow and transmits the data to the SSL VSM 1206 thereafter. At the mean while, the system continues direct the existing data flow to the SSL VSM 1206 through the edge 1211. This parallel processing continues until certain conditions are satisfied. In one embodiment, the condition may be a pre-specified amount data of existing flow that needs to be processed. In an alternative embodiment, the condition may be a pre-specified period of time. The changes of the topology may be aborted anytime before the conditions to commit (e.g., commit 1230) are satisfied. If the conditions are met first, the configuration may look similar to configuration 1203. If the changes are aborted before the conditions are met, the system reverts the graph from configuration 1202 back (e.g., rollback 1220) to the original configuration, such as configuration 1201.

Once the conditions are satisfied, the system directs all of the traffics to the new VPN VSM 1208. Once the VPN VSM 1208 stabilizes, the system disconnects the edges 1211 between the SSL VSM 1206 and the firewall VSM 1205. As a result, VPN VSM service has been added to the graph dynamically and the services being provided originally by the edge 1211 is not disrupted.

If the changes are aborted, the system directs all of the new flows data to the SSL VSM 1206 through the edge 1211. The system terminates any flows going through the edge 1209, the VPN VSM 1208, and the edge 1210. The system continues directing the existing data flow to the SSL VSM 1206 through the edge 1211. The system disconnects the edges 1209 and 1210, and the VPN VSM 1208. Thus the graph has been reverted (e.g., rollback 1220) to the original topology.

Figure 12B:
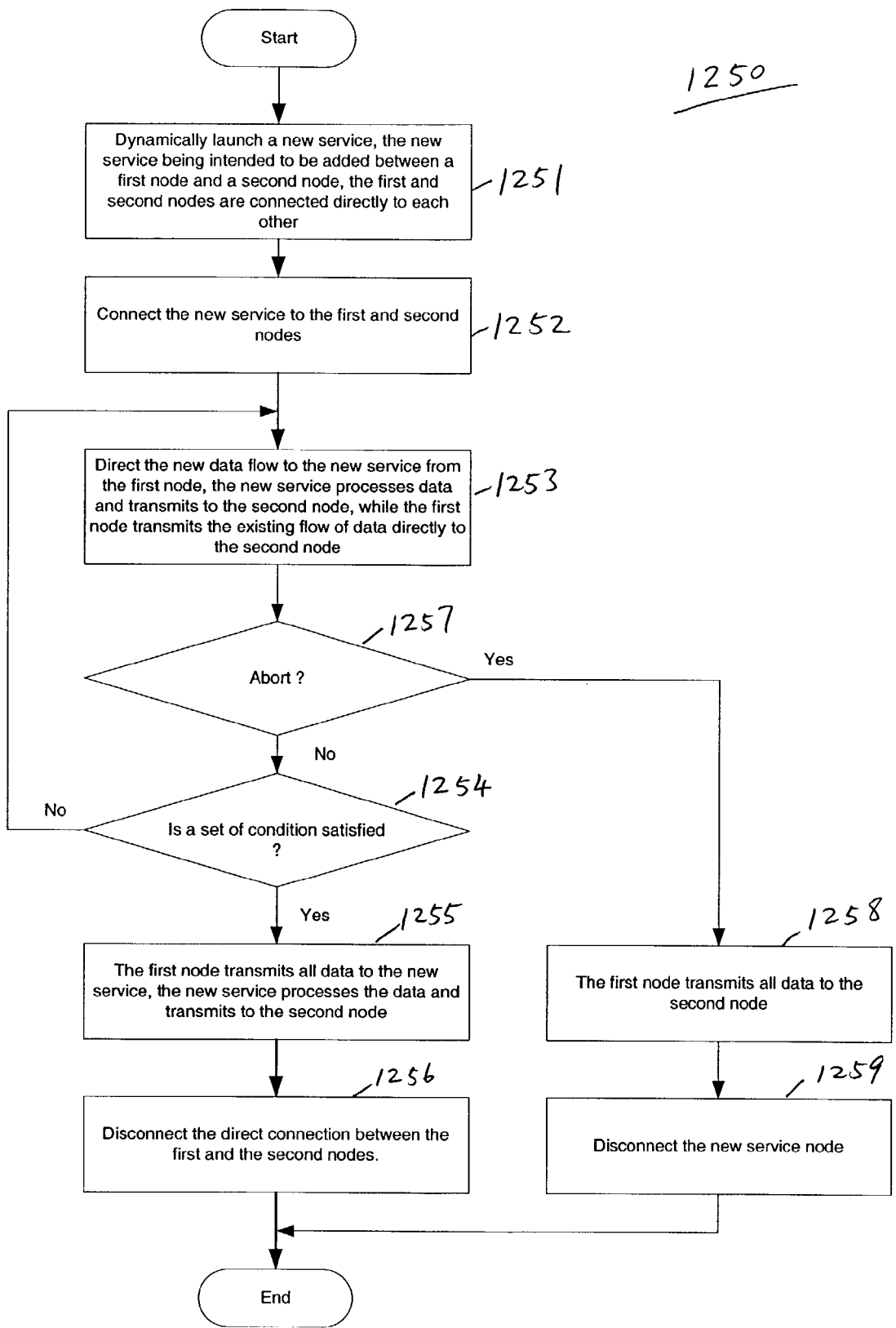
FIG. 12B shows a flow chart illustrating an exemplary processing of dynamic change/upgrade of a topology in a virtual network system according to an alternative embodiment of the invention.

FIG. 12B shows a flowchart illustrating an exemplary method of changing a topology according to an embodiment of the invention. In one embodiment, the method illustrates processing a request for changing a topology having a direct connection between a first node and a second node in a network environment. The method includes dynamically launching a new service, the service intended to be added between the first and second nodes, connecting the new service node between the first and the second nodes, directing requests for service to the new service from the first node to the new node and thereafter transmit the requests to the second node, and terminating the direct connection between the first and second node. In an alternative embodiment, the method further includes determining whether the requests for service come from a new session of data, transmitting the requests for service to the new service if the requests for service come from a new session of data, and transmitting the requests for service to the direct connection between the first and second nodes if the requests for service come from an existing session of data.

Referring to FIG. 12B, when request is received, at block 1251, the system dynamically launches a new service, the new service is intended to be added between a first node and a second node, the first and the second nodes are connected directly to each other through an edge. After the new service has been launched, at block 1252, the system connects the new service to the first and the second nodes. The system then directs the new data flow to the new service from the first node, the new service processes new data flow and transmits the data to the second node.

At the mean while, the first node continue to transmit the existing data flow to the second node directly through the edge directly connecting with the first and the second nodes. These parallel processing continues until certain conditions are satisfied checked by the system at block 1254. If the conditions are satisfied, at block 1255 the system instructs the first node transmit all data flows to the new service, the new service processes the data and transmits to the second node. Once the new service is up and running, at block 1256, the system disconnects the edge directly connecting the first and the second nodes.

As discussed above, anytime before the condition is satisfied, the changes may be aborted instantaneously. If an abortion request is received at block 1257, before the condition is satisfied, the configuration of the graph is rolled back to its original configuration. In one embodiment, at block 1158, the first node transmits all data to the second node and the new service node (e.g., VPN VSM 1208) is disconnected (e.g., edges 1209 and 1210) from the graph at block 1259. Thereafter, the system terminates the new service to complete the rollback operation.

Figure 13A:
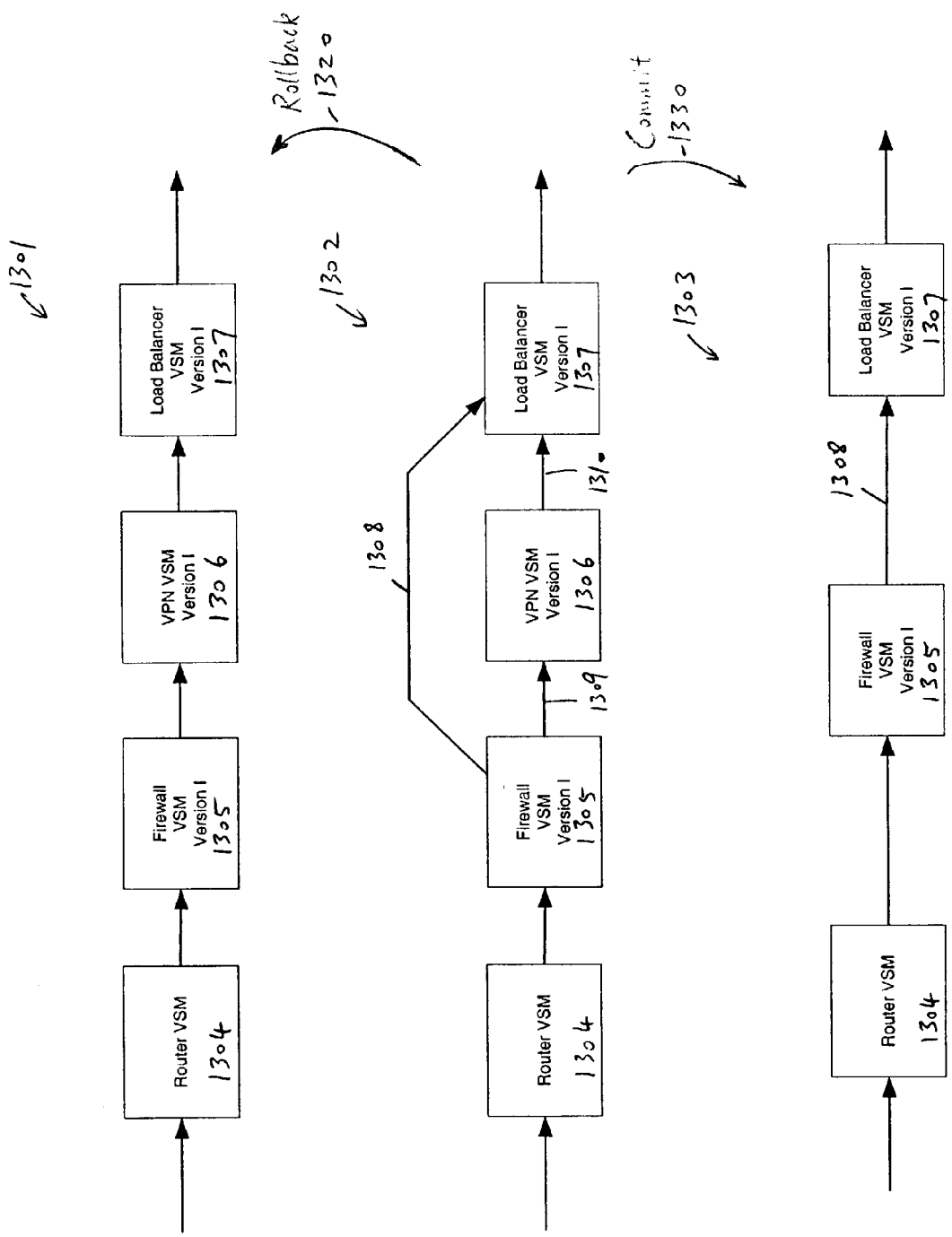
FIG. 13A shows a block diagram of dynamic change/upgrade of a topology in a virtual network system according to yet another alternative embodiment of the invention.

FIG. 13A shows an exemplary block diagram illustrating changes of a topology of a virtual network system according to an embodiment of the invention. Referring to FIG. 13A, in one embodiment, an initial configuration 1301 of a topology processes a data flow through router VSM 1304, a firewall VSM 1305, a VPN VSM 1306, and a load balancer VSM 1307. When a change request (e.g., deleting the VPN VSM 1306 from the graph) is received (e.g., through a user interface of the management virtual rack), an edge 1308 is created to connect the firewall VSM 1305 and the load balancer VSM 1307.

Once the edge 1308 is created and connected, the system instructs the firewall VSM 1305 to transmit any new data flow to the load balancer VSM 1307 directly through the edge 1308, while the existing data flow is transmitted by the firewall VSM 1305 to the load balancer VSM 1307 through the VPN VSM 1306. Thus, the edge 1308 and the VPN VSM 1306 are running in parallel, as shown in configuration 1202. This parallel processing continues until certain conditions are satisfied. In one embodiment, the condition may be a pre-specified amount data of existing flow that needs to be processed. In an alternative embodiment, the condition may be a pre-specified period of time.

Similarly, according to one embodiment of the invention, anytime before the condition is satisfied, the changes may be aborted instantaneously. In one embodiment, such abortion request may be inputted through a user interface of a management module (e.g., interface of the management virtual rack), such as manage module 600 of FIG. 6 discussed above.

Once the conditions are satisfied, the system directs all of the traffics from the firewall VSM 1305 directly to the load balancer VSM 1307 through the edge 1308. Once the data processing of the edge 1308 stabilizes, the system disconnects the edges 1309 and 1310 between the VPN VSM 1306 and the firewall VSM 1305 and the load balancer VSM 1307. Thereafter, the VPN VSM 1306 is terminated and removed from the graph. As a result, VPN VSM service has been deleted from the graph dynamically and the services being provided originally by the virtual rack is not disrupted.

If the changes are aborted, the system directs all of the new flows data to the VPN VSM 1306 through the edges 1309 and 1310. The system terminates any flows going through the edge 1308. The system continues directing the existing data flow to the VPN VSM 1306 through the edges 1309 and 1310. Thereafter, the system disconnects the edge 1308. Thus the graph has been reverted (e.g., rollback 1320) to the original topology.

Figure 13B:
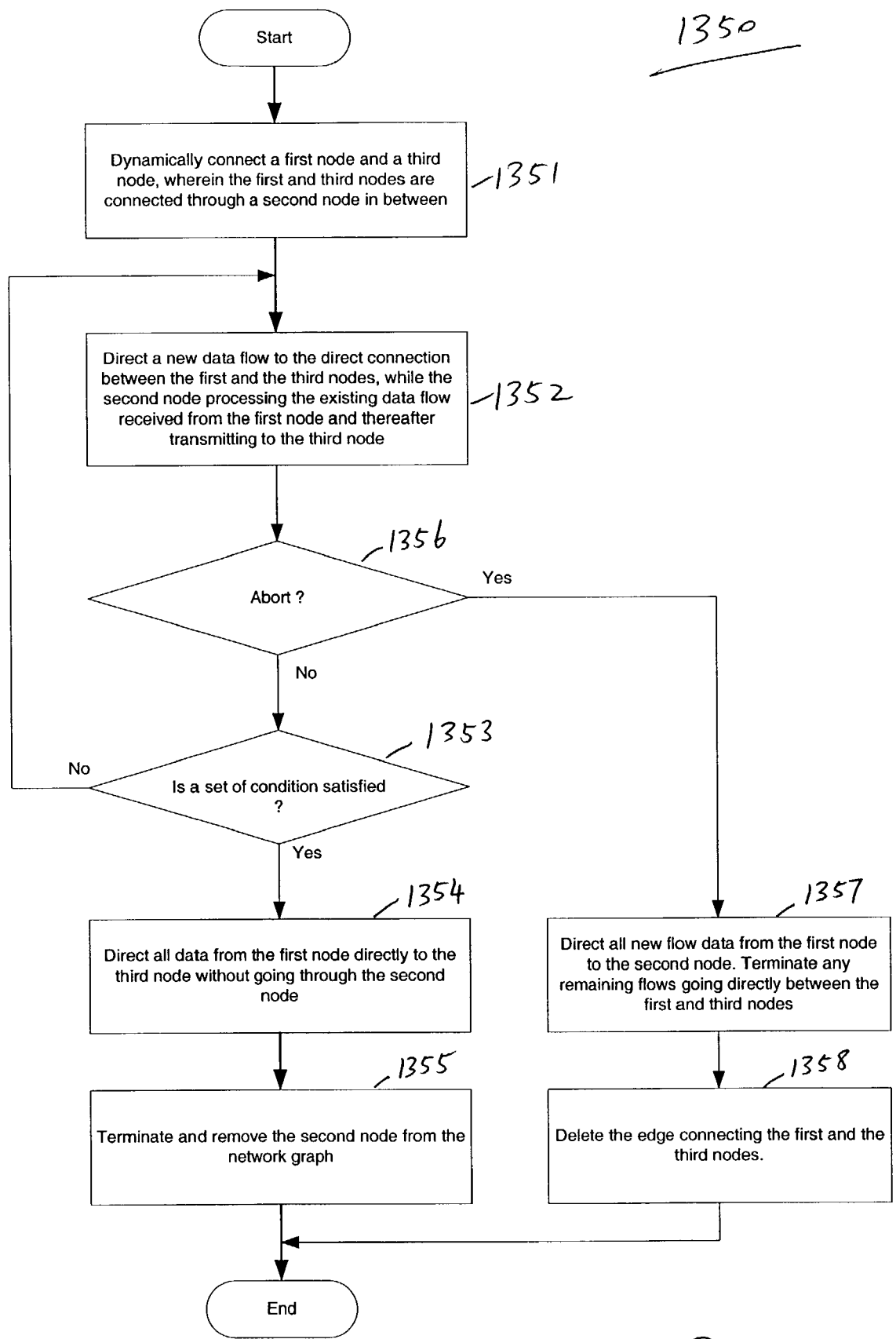
FIG. 13B shows a flow chart illustrating an exemplary processing of dynamic change/upgrade of a topology in a virtual network system according to yet another alternative embodiment of the invention.

FIG. 13B shows a flowchart illustrating an exemplary method of changing a topology according to an embodiment of the invention. In one embodiment, the method illustrates processing a request for changing a topology having a first node, a second node, and a third node, the first node being directly connected to the second node and the second node being directly connected to the third node. The method includes dynamically connecting the first and third nodes, directing requests for service directly from the first node to the second node, and terminating the second node. In an alternative embodiment, the method further includes determining whether the requests for service come from a new session of data, transmitting the requests for service directly from the first node to the third node, if the requests for service come from a new session of data, and transmitting the requests for service from the first node to the second node and from second node to the third node, if the requests for service come from an existing session of data.

Referring to FIG. 13B, when request is received, at block 1351, the system dynamically connects a first node and a third node, wherein the first and the third node are connect through a second node in between. Once the connection between the first and the third nodes are created, at block 1352, the system directs the new data flow to the direct connection between the first and third nodes. At the mean while, the second node is still processing the existing data flow received from the first node and thereafter transmitting the data to the third node. This parallel processing continues until a set of conditions is satisfied at block 1353. Upon which, at block 1354, the system directs all data flows from the first node directly to the third node without going through the second node. At block 1355, the second node is terminated and removed from the graph, since it is no longer needed.

As discussed above, anytime before the condition is satisfied, the changes may be aborted instantaneously. If an abortion request is received at block 1356, before the condition is satisfied, the configuration of the graph is rolled back to its original configuration. In one embodiment, at block 1357, the system directs all new data from the first node to the second node, terminates any remaining flows going directly between the first and the second nodes. Thereafter, at block 1358, the system deletes the edge connecting the first and the second nodes to complete the rollback operation.

FIG. 14 shows yet another exemplary block diagram illustrating changes of a topology of a virtual network system according to an embodiment of the invention. Referring to FIG. 14, in one embodiment, an initial configuration 1401 of a topology processes a data flow through router VSM 1404, a firewall VSM 1405, an SSL VSM 1406, and a load balancer VSM 1407. When a change request is received through a user interface of the management virtual rack, for example, adding a VPN VSM 1408 and upgrading the SSL VSM 1406 from version I to version II 1409, the system launches the corresponding VPN VSM 1408 and SSL VSM version II 1409 respectively. The system then connects the VPN VSM 1408 and SSL VSM 1409 to the firewall VSM 1405 and the load balancer VSM 1407.

Once the VPN VSM 1408 and SSL VSM 1409 are running, the system instructs the firewall VSM 1405 to transmit any new data flow to the VPN VSM 1408 and SSL VSM 1409 branch and thereafter transmits the data to the load balancer VSM 1407. At the mean while the existing data flow is transmitted by the firewall VSM 1405 to the load balancer VSM 1407 through the SSL VSM version I 1406, as shown in configuration 1402. This parallel processing continues until certain conditions are satisfied. In one embodiment, the condition may be a pre-specified amount data of existing flow that needs to be processed. In an alternative embodiment, the condition may be a pre-specified period of time.

Once the conditions are satisfied, the system directs all of the traffics from the firewall VSM 1405 to the VPN VSM 1408 and SSL VSM 1409 branch and thereafter to the load balancer VSM 1407. Once the VPN VSM 1408 and SSL VSM 1409 branch stabilizes, the system terminates and removes the SSL VSM version I 1406 from the graph, as shown in configuration 1403. As a result, VPN VSM 1408 service has been added to the graph and the SSL VSM has been upgraded dynamically and the services being provided is not disrupted throughout the processing. Similar to the operations of FIGS. 11A, 12A, and 13A, the embodiment of FIG. 14 includes rollback operation 1420 if the changes is aborted, and commit operation 1430 when the corresponding condition is satisfied.

It will be appreciated that more or fewer processes may be incorporated into the methods illustrated in the Figures without departing from the scope of the invention and that no particular order is implied by the arrangement of blocks shown and described herein. It further will be appreciated that the processes described in conjunction with Figures may be embodied in machine-executable instructions, e.g. software. The instructions can be used to cause a general-purpose or special-purpose processor that is programmed with the instructions to perform the operations described. Alternatively, the operations might be performed by specific hardware components that contain hardwired logic for performing the operations, or by any combination of programmed computer components and custom hardware components.

The methods may be provided as a computer program product that may include a machine-readable medium having stored thereon instructions which may be used to program a computer (or other electronic devices) to perform the methods. For the purposes of this specification, the terms "machine-readable medium" shall be taken to include any medium that is capable of storing or encoding a sequence of instructions for execution by the machine and that cause the machine to perform any one of the methodologies of the present invention. The term "machine-readable medium" shall accordingly be taken to included, but not be limited to, solid-state memories, optical and magnetic disks, and carrier wave signals. Furthermore, it is common in the art to speak of software, in one form or another (e.g., program, procedure, process, application, module, logic . . . ), as taking an action or causing a result. Such expressions are merely a shorthand way of saying that execution of the software by a computer causes the processor of the computer to perform an action or a produce a result.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method for processing a request of changing a first node having a first service connecting with a second node in a network environment, the method comprising:
   dynamically launching a second service at the first node;
   connecting the second service with the second node;
   determining whether requests for service come from a new session of data after the second service was launched;
   transmitting the requests for service to the second service if the requests for service come from the new session of data;
   transmitting the requests for service to the first service if the requests for service come from an existing session of data opened before the second service was launched; and
   changing the first node by terminating the first service.

2. The method of claim 1, wherein the first service is terminated when a pre-specified condition is satisfied.

3. The method of claim 2, wherein the pre-specified condition comprises an amount of data that needs to be processed.

4. The method of claim 2, wherein the pre-specified condition comprises passage of a period of time.

5. The method of claim 2, further comprising:
   detecting whether the request has been aborted before the condition is satisfied; and
   dynamically rolling back configuration of the first node to its original configuration.

6. The method of claim 5, wherein rollback operation comprises:
   directing all requests for services through the first service; and
   terminating data processing at the second service.

7. The method of claim 6, further comprising:
   disconnecting the second service from the network; and
   terminating the second service.

8. The method of claim 1, wherein connection of between the second service and the second node is established while the first service processing the requests for service.

9. The method of claim 1, wherein the request for changing the first node is received from an input through a user interface.

10. A method for processing a request of changing a topology having a direct connection between a first node and a second node in a network environment, the method comprising:
    dynamically launching a new service, the service intended to be added between the first and second nodes;
    connecting the new service with the first and the second nodes;
    determining whether requests for service come from a new session of data after the new service was launched;
    transmitting the requests for service to the new service if the requests for service come from the new session of data;
    transmitting the requests for service to the direct connection between the first and second nodes if the requests for service come from an existing session of data opened before the new service was launched; and changing the topology by terminating the direct connection between the first and second node.

11. The method of claim 10, wherein the direct connection is terminated when a pre-specified condition is satisfied.

12. The method of claim 11, wherein the pre-specified condition comprises an amount of data that needs to be processed.

13. The method of claim 11, wherein the pre-specified condition comprises passage of a period of time.

14. The method of claim 11, further comprising:
detecting whether the request has been aborted before the condition is satisfied; and
dynamically rolling back configuration between the first and the second nodes to its original configuration.

15. The method of claim 14, wherein rollback operation comprises:
directing all requests for services directly from the first node to the second node; and
terminating the new service.

16. The method of claim 10, wherein connections between the new service and the first and the second node are established while the requests for service being processed.

17. A method in a network environment, for processing a request of changing a topology having a first node, a second node, and a third node, the first node being directly connected to the second node and die second node being directly connected to the third node, the method comprising:
dynamically connecting the first and third nodes;
determining whether requests for service come from a new session of data after the first and third nodes were connected;
transmitting the requests for service directly from the first node to the third node, if the requests for service come from the new session of data;
transmitting the requests for service from the first node to the second node and from second node to the third node, if the requests for service come from an existing session of data opened before the first and third nodes were connected; and
changing the topology by terminating the second node.

18. The method of claim 17, wherein the second node is terminated when a pro-specified condition is satisfied.

19. The method of claim 18, wherein the pre-specified condition comprises an amount of data that needs to be processed.

20. The method of claim 18, wherein the pre-specified condition comprises passage of a period of time.

21. The method of claim 18, further comprising:
detecting whether the request has been aborted before the condition is satisfied; and
dynamically rolling back configuration between the first and the third nodes to its original configuration.

22. The method of claim 21, wherein rollback operation comprises:
directing all requests for services from the first node to the second node;
terminating remaining requests for services being processed between the first and the third nodes; and
disconnecting direct connection between the first and the third nodes.

23. The method of claim 17, wherein connection of between the first node and the third node is established while the requests for service being processed through the first, the second, and the third nodes.

24. A system for changing a node having a first service in a network environment, the system comprising:

a second service dynamically launched at the node, the second service operating in parallel with the first service, wherein the first service processes an existing flow of data and the second processes a subsequent new flow of data simultaneously; and
a pre-specified condition when satisfied, the node is changed so that the second service processes all flows of data and the first service is terminated.

25. The system of claim 24, wherein the pre-specified condition comprises an amount of data that needs to be processed.

26. The system of claim 24, wherein the pre-specified condition comprises a period of time.

27. The system of claim 24, further comprising an abortion request when received before the condition is satisfied, configuration of the node is rolled back to its original configuration dynamically.

28. The system of claim 27, wherein the rollback operation comprises:
directing all flows of data to the first service for processing; and
terminating the second service.

29. A system for changing a topology having a direct connection between a first node and a second node in a network environment, the system comprising:
at least one new services dynamically launched, the at least one new services coupling the first and the second nodes, wherein the at least one new services process a subsequent new flow of data, while an existing flow of data being transferred from the first node to the second node directly; and
a pre-specified condition when satisfied, the topology is changed so that the at least one new services process all flows of data and the direct connection between the first and the second nodes is terminated.

30. The system of claim 29, wherein time pre-specified condition comprises an amount of data that needs to be processed.

31. The system of claim 29, wherein the pre-specified condition comprises a period of time.

32. The system of claim 29, further comprising an abortion request when received before the condition is satisfied, configuration of the topology is rolled back to its original configuration dynamically.

33. The system of claim 32, wherein the rollback operation comprises:
directing all flows of data directly from the first node to the second node; and
terminating the at least one new services.

34. A machine-readable medium having executable code to cause a machine to perform a method for processing a request of changing a first node having a first service connecting with a second node in a network environment, the method comprising:
dynamically launching a second service at the first node;
connecting the second service with the second node;
determining whether requests for service come from a new session of data after the second service was launched;
transmitting the requests for service to the first service if the requests for service come from an existing session of data opened before the second service was launched; and modifying the first node by terminating the first service.

35. The machine-readable medium of claim 34, wherein the method further comprises:
detecting whether the request has been aborted; and dynamically rolling back configuration of the first node to its original configuration, if the request has been aborted.

36. A machine-readable medium having executable code to cause a machine to perform a method for processing a request of changing a topology having a direct connection between a first node and a second node in a network environment, the method comprising:
   dynamically launching a new service, the service intended to be added between the first and second nodes;
   connecting the new service with the first and the second nodes;
   determining whether requests for service come from a new session of data after connecting the new service with the first and the second nodes;
   transmitting the requests for service to the new service if the requests for service come from the new session of data;
   transmitting the requests for service to the direct connection between the first and second nodes if the requests for service come from an existing session of data opened before connecting the new service with the first and the: second nodes; and
   modifying the topology by terminating the direct connection between the first and second node.

37. The machine-readable medium of claim 36, wherein the method further comprises:
   detecting whether the request has been aborted; and
   dynamically rolling back configuration between: the first and the second nodes to its original configuration, if the request has been aborted.

38. A machine-readable medium having executable code to cause a machine to perform a method for processing a request of changing a topology having a first node, a second node, and a third node, the first node being directly connected to the second node and the second node being directly connected to the third node, the method comprising:
   dynamically connecting the first and third nodes;
   transmitting requests for service directly from the first node to the third node, if the requests for service come from a new session of data opened after connecting the first and third nodes; and
   changing the topology by transmitting the requests for service from the first node to the second node and from second node to the third node, if the requests for service come from an existing session of data opened before connecting the first and third nodes.

39. The machine-readable medium of claim 38, wherein the method further comprises:
   detecting whether the request has been aborted; and
   dynamically rolling back configuration between the first and the second nodes to its original configuration, if the request has been aborted.

* * * * *